(12) United States Patent
Zhao et al.

(10) Patent No.: US 12,187,171 B2
(45) Date of Patent: Jan. 7, 2025

(54) SAFETY BELT ADJUSTING STRUCTURE, AND CHILD SAFETY SEAT

(71) Applicant: WONDERLAND SWITZERLAND AG, Steinhausen (CH)

(72) Inventors: Guanghui Zhao, Guangdong (CN); Bo Wu, Guangdong (CN); Yanmin Chen, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/032,469

(22) PCT Filed: Oct. 18, 2021

(86) PCT No.: PCT/CN2021/124481
§ 371 (c)(1),
(2) Date: Apr. 18, 2023

(87) PCT Pub. No.: WO2022/083556
PCT Pub. Date: Apr. 28, 2022

(65) Prior Publication Data
US 2023/0391232 A1 Dec. 7, 2023

(30) Foreign Application Priority Data

Oct. 19, 2020 (CN) .......................... 202022337083.7
Nov. 19, 2020 (CN) .......................... 202022713068.8
Jul. 19, 2021 (CN) .......................... 202110814966.9

(51) Int. Cl.
*B60N 2/26* (2006.01)
*B60R 22/20* (2006.01)
*B60R 22/26* (2006.01)

(52) U.S. Cl.
CPC .............. *B60N 2/265* (2013.01); *B60R 22/20* (2013.01); *B60R 22/26* (2013.01)

(58) Field of Classification Search
CPC ..... B60R 22/105; B60R 22/20; B60N 2/2803; B60N 2/265
See application file for complete search history.

(56) References Cited

U.S. PATENT DOCUMENTS

| 4,891,454 | A | | 1/1990 | Perdelwitz | |
| 5,449,223 | A | * | 9/1995 | Miculici | B60R 22/20 297/483 |

(Continued)

FOREIGN PATENT DOCUMENTS

| AU | 4737599 A | 3/2000 |
| CN | 101010219 A | 8/2007 |

(Continued)

OTHER PUBLICATIONS

Notice of Reasons for Refusal issued in corresponding Japanese Application No. 2023-524164 dated Jan. 12, 2024. English translation included.

(Continued)

*Primary Examiner* — Milton Nelson, Jr.
(74) *Attorney, Agent, or Firm* — Volpe Koenig

(57) ABSTRACT

A seatbelt adjusting structure, a child carrier comprising the seat belt adjusting structure, and a child safety seat. The seat belt adjusting structure is suitable for adjusting the position of a seatbelt of the child carrier corresponding to the shoulder of a child, the seatbelt adjusting structure comprises a supporting member movably arranged on the child carrier, the supporting member is provided with a plurality of rows of adjusting parts which are arranged at different heights and are used for accommodating the seat belt, and the position of the seat belt corresponding to the shoulder of the child is adjusted by means of the movement of the supporting member in combination with the cooperation between the seat belt and the adjusting parts arranged at (Continued)

different heights. An opening part used for adjusting the seat belt can be further formed on the supporting member.

18 Claims, 20 Drawing Sheets

(56) References Cited

U.S. PATENT DOCUMENTS

| | | | |
|---|---|---|---|
| 5,899,534 A * | 5/1999 | Gray | B60N 2/3084 |
| | | | 297/238 |
| 6,189,970 B1 | 2/2001 | Rosko | |
| 6,543,847 B2 | 4/2003 | Balensiefer | |
| 6,695,412 B2 | 2/2004 | Barger | |
| 6,698,841 B1 | 3/2004 | Giover et al. | |
| 6,799,807 B1 | 10/2004 | Chen | |
| 7,469,965 B2 | 12/2008 | Glover et al. | |
| 7,648,199 B2 | 1/2010 | Amesar et al. | |
| 7,735,919 B2 | 6/2010 | Chen et al. | |
| 10,069,590 B1 | 9/2018 | Wang | |
| 10,575,658 B2 | 3/2020 | Romero | |
| 11,325,508 B2 * | 5/2022 | Johnson | B60N 2/829 |
| 2009/0196602 A1 | 8/2009 | Saunders | |
| 2009/0309405 A1 * | 12/2009 | Maciejczyk | B60N 2/2851 |
| | | | 297/391 |
| 2011/0133532 A1 | 6/2011 | Zhao | |
| 2012/0019034 A1 | 1/2012 | Young | |
| 2014/0284978 A1 | 9/2014 | Hutchinson | |
| 2017/0043684 A1 | 2/2017 | Yang et al. | |
| 2019/0126790 A1 | 5/2019 | Maciejczyk | |
| 2019/0288775 A1 | 9/2019 | Maeda | |

FOREIGN PATENT DOCUMENTS

| | | |
|---|---|---|
| CN | 108422903 A | 8/2018 |
| CN | 208149119 U | 11/2018 |
| CN | 213948216 U | 8/2021 |
| EP | 0650872 A1 | 5/1995 |
| EP | 3085575 A1 | 10/2016 |
| JP | S5320722 U | 2/1978 |
| JP | S53121637 U | 9/1978 |
| JP | S55138145 U | 10/1980 |
| JP | S62171336 U | 10/1987 |
| JP | H02008636 U | 1/1990 |
| JP | H02141533 U | 11/1990 |
| JP | H05254366 A | 10/1993 |
| JP | 2000127816 A | 5/2000 |
| JP | 3105239 U | 10/2004 |
| JP | 2005219732 A | 8/2005 |
| JP | 2007253702 A | 10/2007 |
| JP | 2011514736 A | 5/2011 |
| JP | 2019161448 A | 9/2019 |
| KR | 20010078238 A | 8/2001 |
| KR | 102120986 B1 | 6/2020 |
| TW | 573636 U | 1/2004 |
| TW | I364372 B | 5/2012 |
| TW | M243387 U | 8/2015 |
| WO | 2006015428 A1 | 2/2006 |

OTHER PUBLICATIONS

Non-Final Office Action issued in corresponding U.S. Appl. No. 17/503,329 dated Dec. 27, 2022.
Final Office Action issued in corresponding U.S. Appl. No. 17/503,329 dated Apr. 11, 2023.
Notice of Allowance issued in corresponding U.S. Appl. No. 17/503,329 dated Aug. 2, 2023.
Office Action issued in Chinese Patent Application No. 202110814966. 9, dated Nov. 3, 2022.
International Search Report (with English Translation) and Written Opinion issued in International Patent Application No. PCT/CN2021/124481, dated Jan. 7, 2022.
Office Action issued in Taiwanese Patent Application No. 110138664, dated Apr. 12, 2023.
Partial Supplementary Search Report issued in corresponding European Patent Application No. 21881972.0 on Sep. 20, 2024, consisting of 29 pp.
Office Action issued in corresponding Canadian Patent Application No. 3196072 on Sep. 4, 2024, consisting of 5 pp.
Search Report issued in corresponding Japanese Patent Application No. 2021003922 on Aug. 6, 2024, consisting of 29 pp. (English Translation Provided).
Notice of Reasons for Refusal issued in corresponding Japanese Patent Application No. 2021003922 on Sep. 3, 2024, consisting of 6 pp. (English Translation Provided).
Li, et al. Bit-Wise Achievable Information Rates for Probabilistically Shaped 64-QAM in the Presence of Bandwidth Narrowing due to Cascaded Wavelength Selective Switches. International Conference on Optical Communications and Networks (ICOCN), IEEE, Aug. 23, 2021. IEL Online (IEEE Xplore) Web. https://ieeexplore.ieee.org/stamp/stamp.jsp?tp=&arnumber=9563647.

* cited by examiner

SAFETY BELT ADJUSTING STRUCTURE, AND CHILD SAFETY SEAT

CROSS-REFERENCE TO RELATED APPLICATIONS

The present disclosure is a National Stage 371 of International Patent Application No. PCT/CN2021/124481, filed on Oct. 18, 2021, which claims priorities of Chinese patent application No. 202022713068.8 filed on Nov. 19, 2020 and entitled "Safety Belt Adjusting Structure," Chinese patent application No. 202022337083.7 filed on Oct. 19, 2020 and entitled "Child Safety Seat," and Chinese patent application No. 202110814966.9 filed on Jul. 19, 2021 and entitled "Safety Belt Adjusting Structure," and the entire contents of the above-mentioned Patent Applications are incorporated herein by reference .

TECHNICAL FIELD

The application relates to baby products, in particular to a safety belt adjusting structure and a child safety seat.

BACKGROUND

Baby seats are almost a necessity for babies. In the technology known to the inventors, most safety seats can be used for children of different sizes through adjustment. Among them, the headrest can be adjusted to a suitable position during in the adjustment of the seat, so as to adapt to children of different sizes, but it is difficult to adjust the safety belt to a suitable position. Generally, the adjustment structure of the safety belt is complicated and troublesome to operate, and when the headrest height is adjusted, it is difficult to change the position of the safety belt to a suitable position, which brings some inconvenience to the user.

Therefore, there is an urgent need for a safety belt adjusting structure in which a safety belt can be adjusted to a proper position adapted for different users.

The child safety seat is a seat specially designed for children. By assembling the child safety seat in a car for a child to sit on, the child is bound by the child safety seat, so as to ensure the safety of child during travelling. FIG. 19 shows an existing child safety seat 200a, which includes a seat 201a and a safety belt 202a disposed through the seat. The safety belt 202a is provided with an 8-shaped buckle 203a located in front of the seat 201a, and the 8-shaped buckle 203a is used to adjust the length of the safety belt, so as to ensure the safety belt can firmly bind a child to the seat 201a. However, the existing child safety seat 200a has the following problems: firstly, during the use of the safety belt 202a, a portion of the safety belt 202a located between the front of the seat 201a and the 8-shaped buckle 203a may slide down along the 8-shaped buckle 203a, causing the safety belt to be loose and unable to bind the child to the seat 201a safely, which has potential safety hazards; secondly, the 8-shaped buckle 203a is located in front of the seat 201a, so when a child uses the child safety seat, the 8-shaped buckle 203a may put a strangle on the child's shoulder, causing discomfort to the child.

Therefore, it is necessary to provide a child safety seat that can prevent the safety belt from slipping loose during use.

SUMMARY

An object of the application is to provide a safety belt adjusting structure which can adjust a safety belt to proper positions adapted for different users.

Another object of the application is to provide a carrier with above mentioned safety belt adjusting structure.

A further object of the application is to provide a child safety seat which can prevent the safety belt from slipping loose during use.

In order to achieve the above objects, the application provides a safety belt adjusting structure adapted for adjusting a position of a safety belt of a child carrier corresponding to shoulders of a child. The safety belt adjusting structure comprises a supporting member movably arranged on the child carrier, and a plurality of rows of adjusting portions having different heights are arranged on the supporting member for accommodating the safety belt, such that the position of the safety belt corresponding to the shoulders of the child is adjusted by movement of the supporting member and cooperation of the safety belt with the adjusting portions having different heights.

Compared with the technology known to the inventors, the safety belt adjusting structure of the application comprises a supporting member movably arranged on the child carrier, a plurality of rows of adjusting portions having different heights are arranged on the supporting member, and the safety belt may be cooperated with different adjusting portions. Specifically, the position of the safety belt may be adjusted by moving of the supporting member, such that the position of the safety belt is more adapted for the user. Furthermore, the position of the safety belt may be adjusted through the cooperation of the safety belt with different adjusting portions, such that the safety belt can be adapted for different users. The safety belt adjusting structure of the application can adjust the position of the safety belt, such that the safety belt is adapted for different users. The safety belt adjusting structure of the application may not only adjust the position of the safety belt corresponding to the shoulders of the child by the supporting member, but also adjust the position of the safety belt corresponding to the shoulders of the child by the cooperation of different adjusting portions on the supporting member with the safety belt, which is simple in structure and convenient in operation.

Alternatively, the child carrier is provided with an adjustable headrest, and the safety belt adjusting structure is linked with the headrest.

Alternatively, the supporting member is connected to the headrest.

Alternatively, the supporting member and the headrest are in an integral structure.

Alternatively, the headrest brings the supporting member to move up and down on the child carrier.

Alternatively, each of the adjusting portions is in a form of through slot structure for the safety belt in a horizontal state to move passing through.

Alternatively, the through slot structures of the adjusting portions in two adjacent rows are communicated with each other.

Alternatively, the through slot structures of the adjusting portions in two adjacent rows are communicated with each other by a vertical slot structure for the safety belt in vertical state to slide.

Alternatively, a connection between each of the through slot structures and the vertical slot structure is arc-shaped.

Alternatively, a first limiting portion is further arranged between each of the through slot structures and the vertical slot structure, and sliding of the safety belt in the through slot structures are limited by the first limiting portion.

Alternatively, a second limiting portion is further arranged between each of the through slot structures and the first limiting portion, and sliding of the safety belt in the through slot structures is limited by the second limiting portion.

Alternatively, a length of each of the through slot structures is longer than a width of the safety belt.

Alternatively, a protruding height of the first limiting portion and/or the second limiting portion in the adjusting portions is higher than a thickness of the safety belt.

Alternatively, an opened portion is arranged on a side of the supporting member, and the opened portion is communicated with at least two through slot structures arranged adjacently, such that the safety belt is transferred between different adjusting portions through the opened portion.

Alternatively, an opened portion communicated with the vertical slot structure is arranged on a side of the supporting member, and the opened portion is communicated with the at least two through slot structures arranged adjacently through the vertical slot structure.

Alternatively, the child carrier is provided with a mounting hole for the safety belt to pass through and be mounted, and the safety belt cooperates with different adjusting portions in the mounting hole.

Alternatively, the child carrier is further provided with a lifting adjustment structure cooperating with the supporting member, and the supporting member is provided with a clamp member cooperating with the lifting adjustment structure, such that the supporting member is able to be located at different positions of the child carrier by the clamp member being clamped to different positions of the lifting adjustment structure.

Alternatively, the lifting adjustment structure is provided with a plurality of clamp holes cooperating with the clamp member, and a position of the supporting member is adjusted by the clamp member being clamped to different clamp holes.

In order to achieve same of the above objects, the application further provides a safety belt adjusting structure adapted for adjusting a position of the safety belt of a child carrier corresponding to shoulders of a child. The safety belt adjusting structure comprises a supporting member movably arranged on the child carrier, and a plurality of rows of adjusting portions having different heights are arranged on the supporting member for accommodating the safety belt, an opened portion communicated with at least two rows of the adjusting portions is further arranged on a side of the supporting member, and the safety belt is able to be cooperated with the adjusting portions having different heights via the opened portion to adjust the position of the safety belt corresponding to shoulders of the child.

Alternatively, a guiding portion is arranged between the opened portion and each of the adjusting portions, and the guiding portion has a structure shaping from wide to narrow gradually along a direction in which the opened portion enters each of the adjusting portions.

Alternatively, a connection between the guiding portion and the opened portion is arc-shaped.

Alternatively, a vertical slot structure is arranged between the opened portion and each of the adjusting portions for the safety belt in vertical state to slide.

Alternatively, a connection between each of the adjusting portions and the vertical slot structure/the opened portion is arc-shaped.

Alternatively, a first limiting portion is further arranged between each of the adjusting portions and the opened portion, and sliding of the safety belt in each of the adjusting portions is limited by the first limiting portion.

Alternatively, a second limiting portion is further arranged between each of the adjusting portions and the first limiting portion, and sliding of the safety belt in each of the adjusting portions is limited by the second limiting portion.

In order to achieve another object, the application provides a child carrier comprising a carrier body, and the carrier body is provided with the above safety belt adjusting structure. A position of the safety belt corresponding to the shoulders of the child is adjusted by the safety belt adjusting structure.

Alternatively, the carrier body is a baby stroller, a sleeping box, or an automobile safety seat.

In an aspect, the application further provides a child safety seat comprising a seat body, safety belts, and adjusting buckle. The safety belt is arranged to be passed through the seat body, and the safety belt has a front belt portion located in front of the seat body and a rear belt portion located behind the seat body, the adjusting buckle is arranged on the rear belt portion and is used for adjusting a length of the front belt portion.

Alternatively, the adjusting buckle is an 8-shaped buckle, and the rear belt portion is passed through the adjusting buckle.

Alternatively, the adjusting buckle abuts against a back of the seat body.

Alternatively, the number of the adjusting buckle is one.

Alternatively, the number of the safety belt is two, and the two safety belts are arranged on the seat body at intervals.

Alternatively, a free end of the front belt portion is provided with a first fixing connection member.

Alternatively, the seat body is provided with a second fixing connection member cooperatively connected to the first fixing connection member.

Alternatively, one of the first fixing connection member and the second fixing connection member is a male buckle, and the other of the first fixing connection member and the second fixing connection member is a female buckle.

Alternatively, the seat body is provided with passage for the safety belt to pass through, the passage forms a front opening on a front side of the seat body, and the passage forms a rear opening on a rear side of the seat body.

Compared with the technology known to the inventors, the child carrier of the application is provided with a safety belt adjusting structure disposed on the carrier body, such that the position of the safety belt corresponding to the shoulders of the child can be adjusted on the carrier body. The carrier body is further provided with a headrest linked with the safety belt adjusting structure, and the position of the safety belt adjusting structure on the carrier can be adjusted by adjusting the headrest, such that the safety belt adjusting structure can perform adjustment better for children of different sizes and habitus. The child carrier of the application can be adapted for children of various sizes and various habitus, and the safety belt is convenient to adjust and more comfortable to use.

Compared with the technology known to the inventors, the child safety seat of the application can adjust the length of the front belt portion by providing the adjusting buckle on the rear belt portion of the safety belt behind the seat body, and by the adjusting buckle located behind the seat body. The arrangement can prevent the front belt portion of the safety belt from slipping loose during use, improve the safety of the child safety seat, and improve the comfort of the child when using the child safety seat as well.

BRIEF DESCRIPTION OF THE DRAWINGS

Various objects, features and advantages of the application will become more apparent by considering the following detailed description of preferred embodiments of the application. The drawings are only exemplary illustrations of the application and are not necessarily drawn to scale. In the drawings, same reference numerals refer to the same or similar parts throughout. Among them.

LIST OF REFERENCE SIGNS

Figure 1:
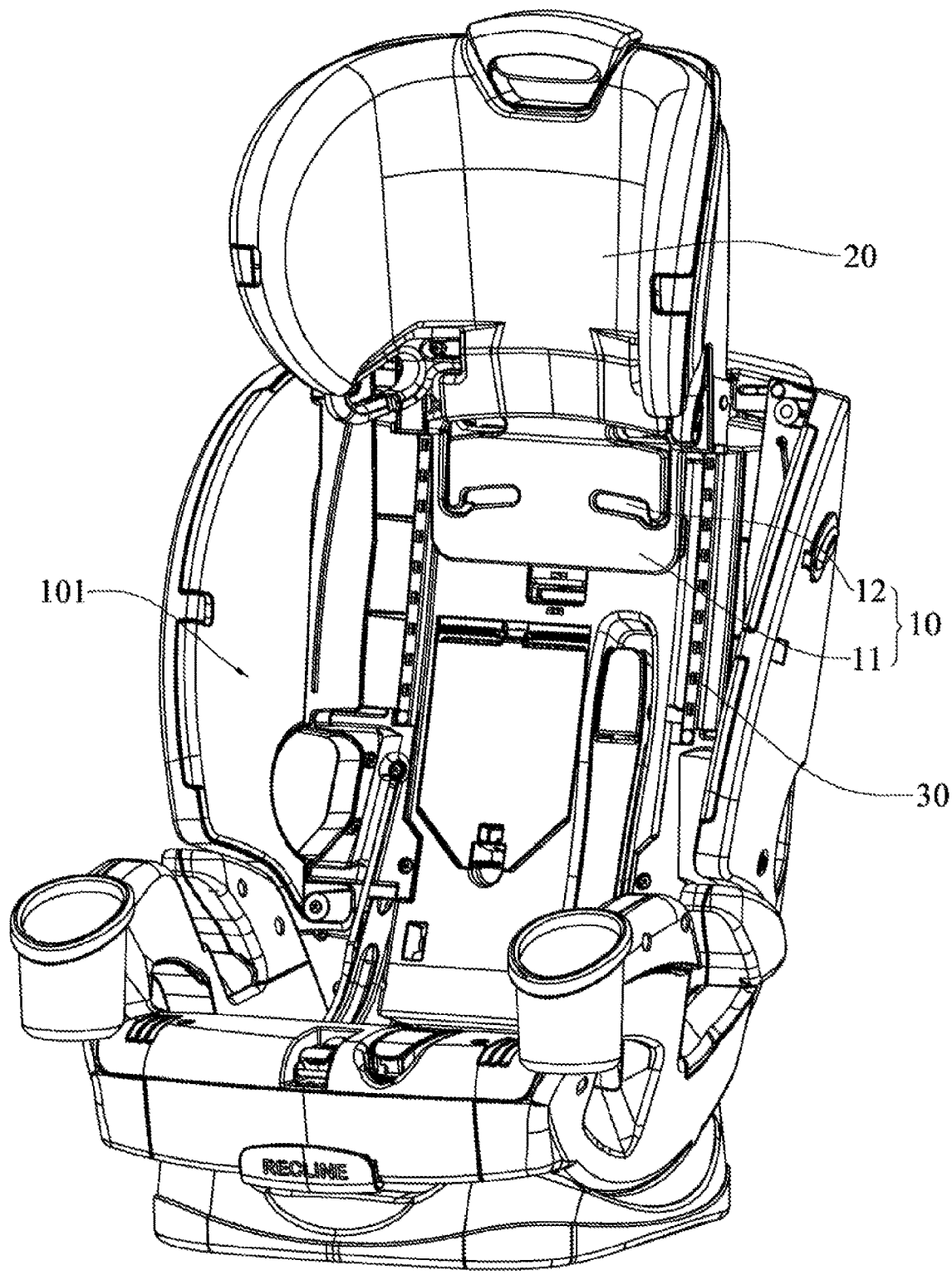
FIG. 1 is a structural schematic view of a child carrier provided by an embodiment of the application.
Figure 2:
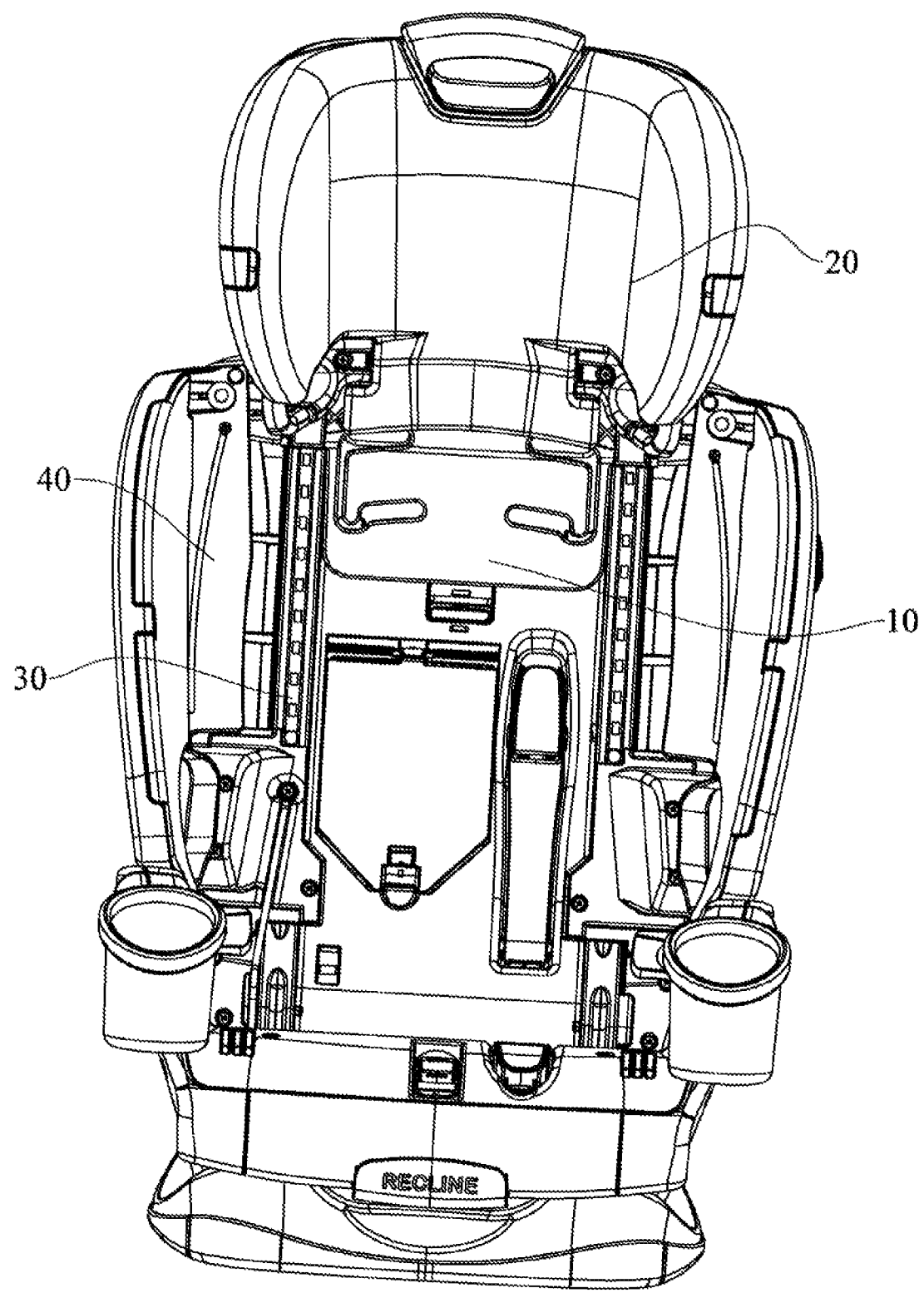
FIG. 2 is a structural schematic view from another angle of FIG. 1.
Figure 3:
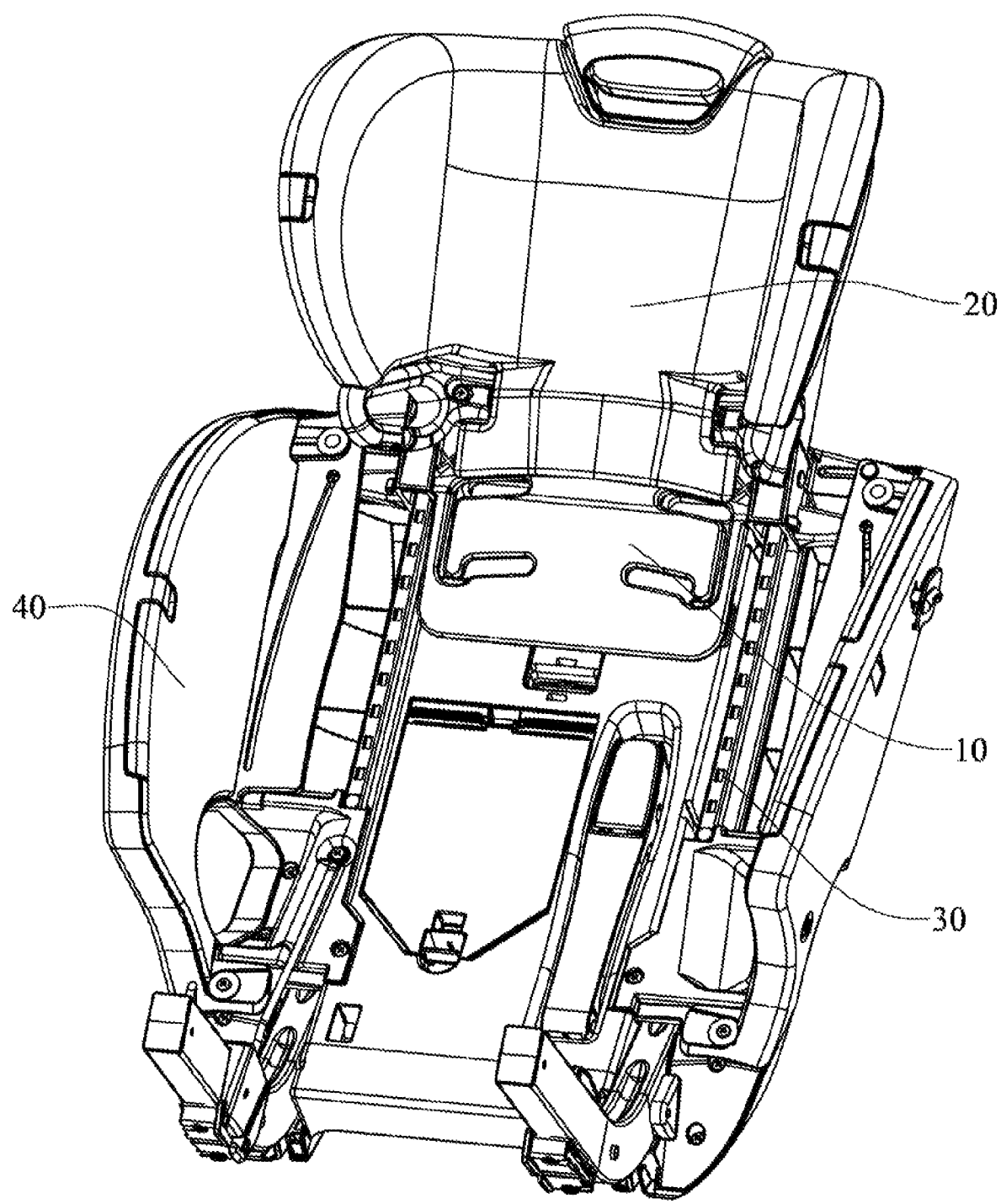
FIG. 3 is a structural schematic view from a further angle of FIG. 1.

100: Child Carrier; 101: Carrier Body;

10: Safety Belt Adjusting Structure; 11: Supporting Member; 12: Adjusting Portion; 120: Through Slot Structure; 121: Arc Portion; 122: First limiting Portion; 123: Second Limiting Portion; 13: Vertical Slot Structure; 14: Clamp Member; 15: Fixing Member; 16: Opened Portion; 161: Guiding Portion;

20: Headrest; 21: Inner Plate; 22: Outer Cover; 211: First Safety Belt Passer;

30: Lifting Adjustment Structure; 31: Clamp Hole;

40: Backrest; 41: Mounting Hole; 42: Second Safety Belt Passer;

100a: Child Safety Seat;

1a: Seat Body; 11a: Second Fixing Connection Member; 12a: Front Opening; 13a: Rear Opening;

2a: Safety Belt; 21a: Front Belt Portion; 22a: Rear Belt Portion; 23a: First Fixing Connection Member;

3a: Adjusting Buckle.

DETAILED DESCRIPTION

In order to specify the technical content and structural features of the application, the following description will be further provided in combination with the embodiment and the attached drawings.

Referring to FIGS. 1 to 6 and 16 to 18, the application provides a child carrier 100. The child carrier 100 includes a carrier body 101 and a safety belt adjusting structure 10 disposed on the carrier body 101. The safety belt adjusting structure 10 is adaptive for performing a position adjustment of a safety belt of the child carrier 100. Among them, the carrier body 101 can be a baby stroller, a sleeping box, or an automobile safety seat, etc. By the safety belt adjusting structure 10, the position of the safety belt on the baby stroller, the sleeping box, or the automobile safety seat can be adjusted. Specifically, the safety belt adjusting structure 10 includes a supporting member 11 movably disposed on the child carrier 100, and a plurality of rows of adjusting portions 12 with different heights are disposed on the supporting member 11 for restraining the safety belt. The position of the safety belt can be adjusted by movement of the supporting member 11 on the child carrier 100 and cooperation between the safety belt and the adjusting portions 12 with different heights. An opened portion 16 communicating with at least two rows of the adjusting portions 12 may also be arranged on a side of the supporting member 11, such that the safety belt can cooperate with the adjusting portions 12 at different heights by the opened portion 16, so as to adjust a position of the safety belt corresponding to shoulders of the child.

After adopting the above technical solution, in the child carrier 100 of the application, the carrier body 101 is provided with the safety belt adjusting structure 10, such that the position of the safety belt corresponding to shoulders of the child on the carrier body 101 can be adjusted. The child carrier 100 of the application can be adapted for children of various sizes and habitus, and the safety belt is convenient to be adjusted and more comfortable to use. The safety belt adjusting structure 10 of the application includes a supporting member 11 movably disposed on the child carrier 100, and a plurality of rows of adjusting portions 12 with different heights are disposed on the supporting member 11, so the safety belt can cooperate with different adjusting portions 12. Specifically, the position of the safety belt can be adjusted by the movement of the supporting member 11, such that the position of the safety belt is more suitable for the user. Furthermore, the position of the safety belt can also be adjusted through a cooperation of the safety belt with different adjusting portions 12, such that the safety belt can be adapted for different users. Of course, it is also possible to adjust a position of the supporting member 11 on the carrier body 101 and at the same time adjust the position of the safety belt on the different adjusting portions 12 of the supporting member 11, such that the safety belt can be more adapted to for children of different sizes and habitus. The safety belt adjusting structure 10 of the application can adjust the position of the safety belt, such that the safety belt is adapted for different users. Moreover, the safety belt adjusting structure 10 of the application may not only adjust the position of the safety belt by the supporting member 11, but also adjust the position of the safety belt via cooperation of different adjusting portions 12 on the supporting member 11 with the safety belt, which is simple in structure, convenient in operation, and better in adaptability.

Referring to FIGS. 1 to 8, in some alternative embodiments, the carrier body 101 is provided with a backrest 40 and a headrest 20 which may be adjusted up and down on the backrest 40. Among them, the safety belt adjusting structure 10 may be linked with the headrest 20, and the safety belt adjusting structure 10 may move up and down with the headrest 20 when the headrest 20 is adjusted up and down. Exemplarily, the supporting member 11 may be connected to the headrest 20, or the safety belt adjusting structure 10 may be directly arranged on the headrest 20, or alternatively, the supporting member 11 and the headrest 20 may be in an integrated structure. In some embodiments, the supporting member 11 can also be movable with respect to the headrest 20. Specific structures and connections of the supporting member 11 and the headrest 20 may be arranged according to actual requirements. Since the safety belt adjusting structure 10 is linked with the headrest 20, when the headrest 20 moves up and down, simultaneously, the safety belt adjusting structure 10 moves up and down with the headrest 20, such that the safety belt adjusting structure 10 and the headrest 20 may be adjusted to a reasonable position at one time, so as to be adapted for children with different habitus. Furthermore, the safety belt may also cooperate with different adjusting portions 12 according to height and weight of children, such that the position of the safety belt may be further adapted for the user, and the use may be more comfortable.

Referring to FIGS. 1 to 8, in some alternative embodiments, a first safety belt passer 211 is disposed on an inner plate 21 of the headrest 20. When an older child uses the child carrier 100 of the application, a safety belt of a car seat may pass through the first safety belt passer 211, so as to provide protection for the seated child. On the other hand, when a younger child uses the child carrier 100 of the application, the position of the headrest 20 may be adjusted more conveniently with the first safety belt passer 211, thereby performing adjustment more conveniently by moving the supporting member 11 with the headrest 20, such that the safety belt may be positioned in a proper range in the supporting member 11 according to the size and habitus of the user. Furthermore, through the cooperation of the safety belt with different adjusting portions 12, the use of the safety belt is more comfortable. In this embodiment, the backrest 40 is provided with a second safety belt passer 42. When using the safety belt adjusting structure 10 on the carrier body 101, the safety belt of the car seat may pass through the second safety belt passer 42, so as to fix the child carrier 100 to the car seat, which is safer to use. By the second safety belt passer 42, the whole carrier body 101 may be moved more conveniently. It may be understood, the safety belt of the car seat would pass through the first safety belt passer 211 or the second safety belt passer 42 when it is engaged with the child carrier 100. By the aid of the first safety belt passer 211 and the second safety belt passer 42, the safety belt of the car seat will provide reliable protection for the child sitting in the child carrier 100, and will not affect the sitting comfort of the child at the same time. By arranging the first safety belt passer 211 and the second safety belt passer 42, the weight of the carrier body 101 may also effectively reduced, which makes the whole body more portable and saves materials. The child carrier 100 of the application may be flexibly adapted for children of various sizes and habitus, and is comfortable to use.

Figure 8:
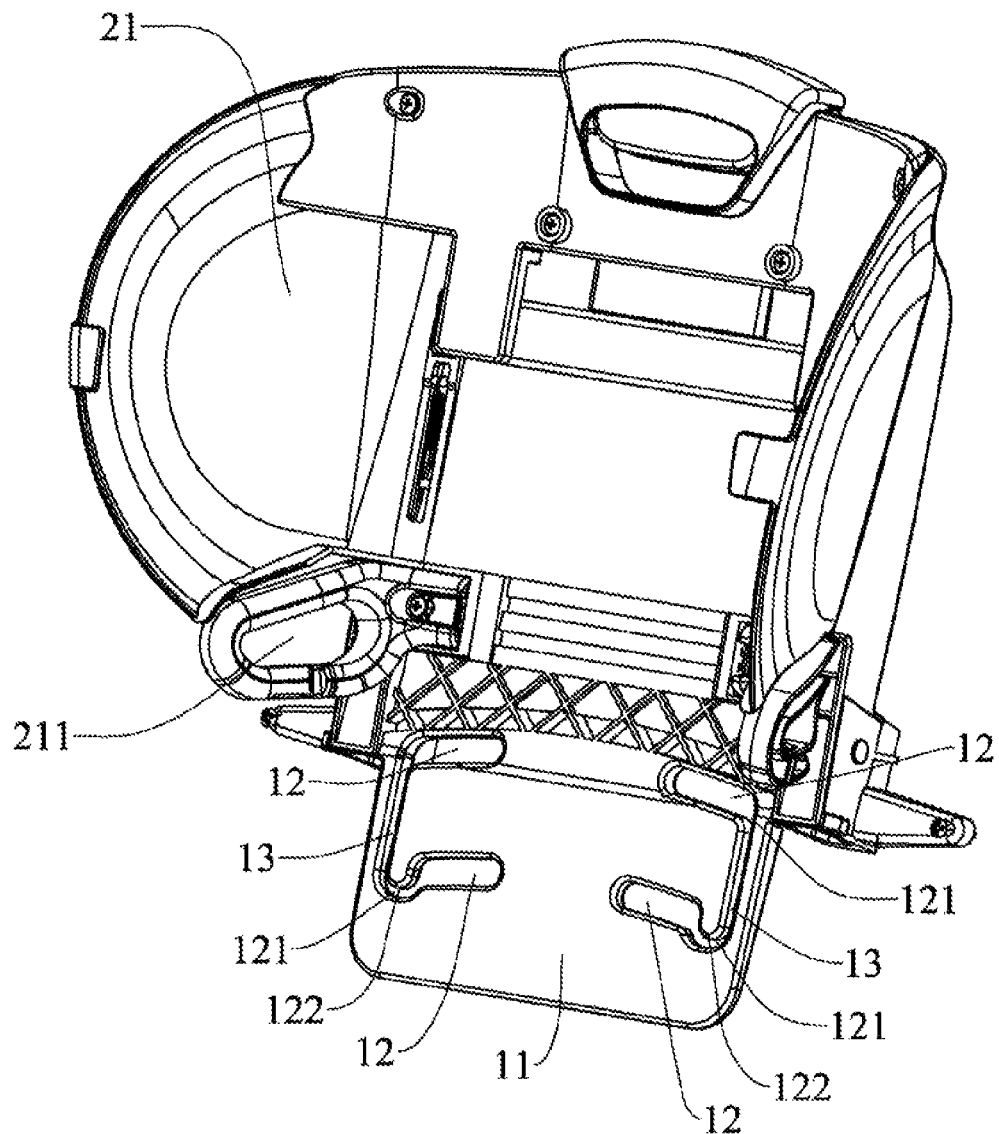
FIG. 8 is a structural schematic view of a headrest in FIG. 1.
Figure 13:
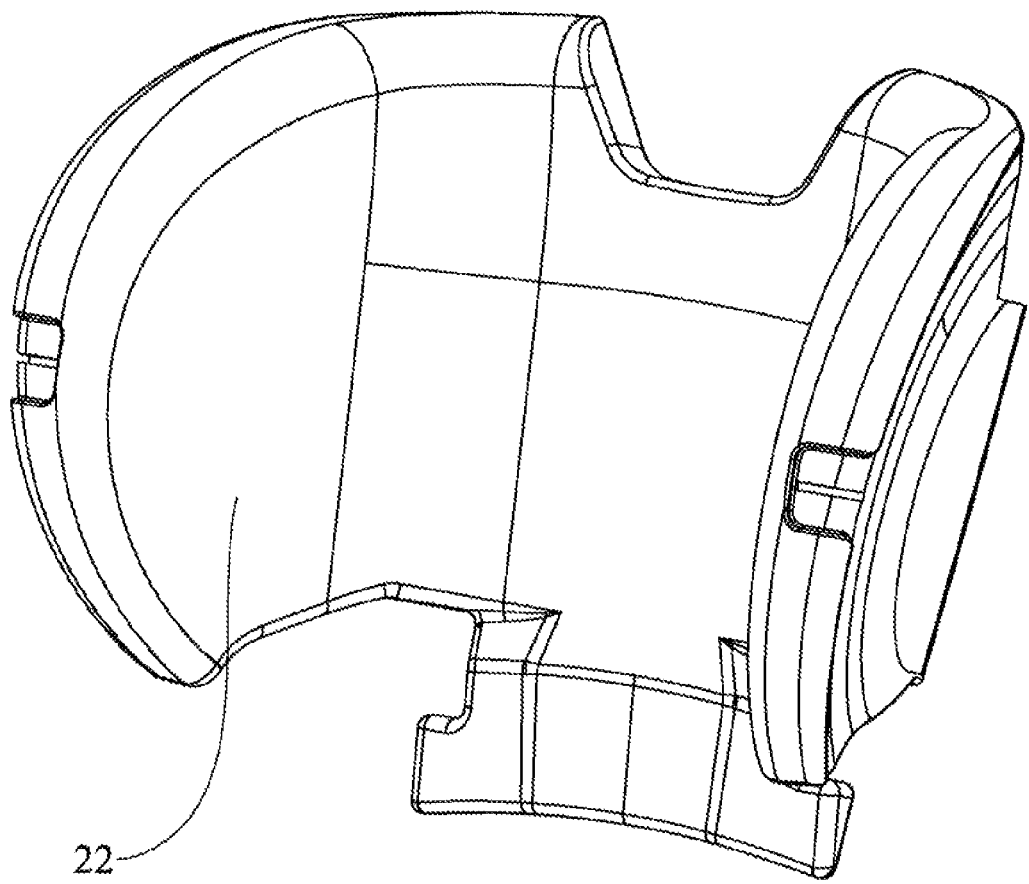
FIG. 13 is a structural schematic view of an outer cover of the headrest in FIG. 8.

Referring to FIGS. 8 and 13, in some alternative embodiments, the headrest 20 includes an inner plate 21 and an outer cover 22. The inner plate 21 may be connected to the supporting member 11, or the inner plate 21 and the supporting member 11 are in an integral structure. The outer cover 22 is detachably sleeved and mounted on the inner plate 21, and the outer shape of the outer cover 22 is matched with the inner plate 21. The outer cover 22 has a flexible structure, such that the user feels more comfortable in use when leaning against the headrest 20. Moreover, the outer cover 22 is detachable, which is more convenient for cleaning. It may be understood, when the outer cover 22 is sleeved on the inner plate 21, the adjusting portions 12 on the supporting member 11 is located outside the outer cover 22, such that the adjusting portions 12 may better cooperate with the safety belt, and the safety belt may be better adjusted among the plurality of adjusting portions 12, which is simple in structure and reasonable in design.

Figure 7:
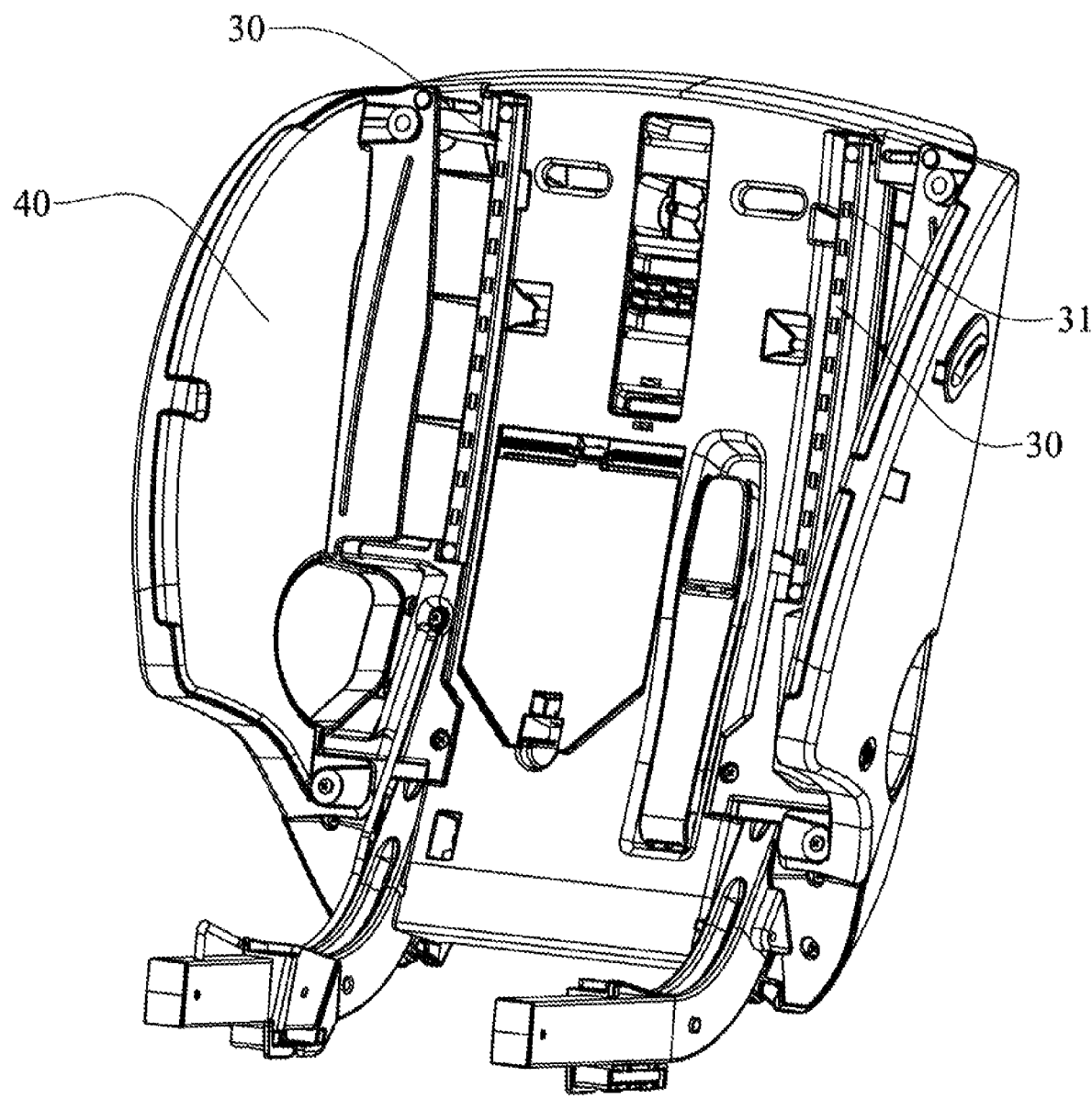
FIG. 7 is a structural schematic view of a backrest in FIG. 1.
Figure 14:
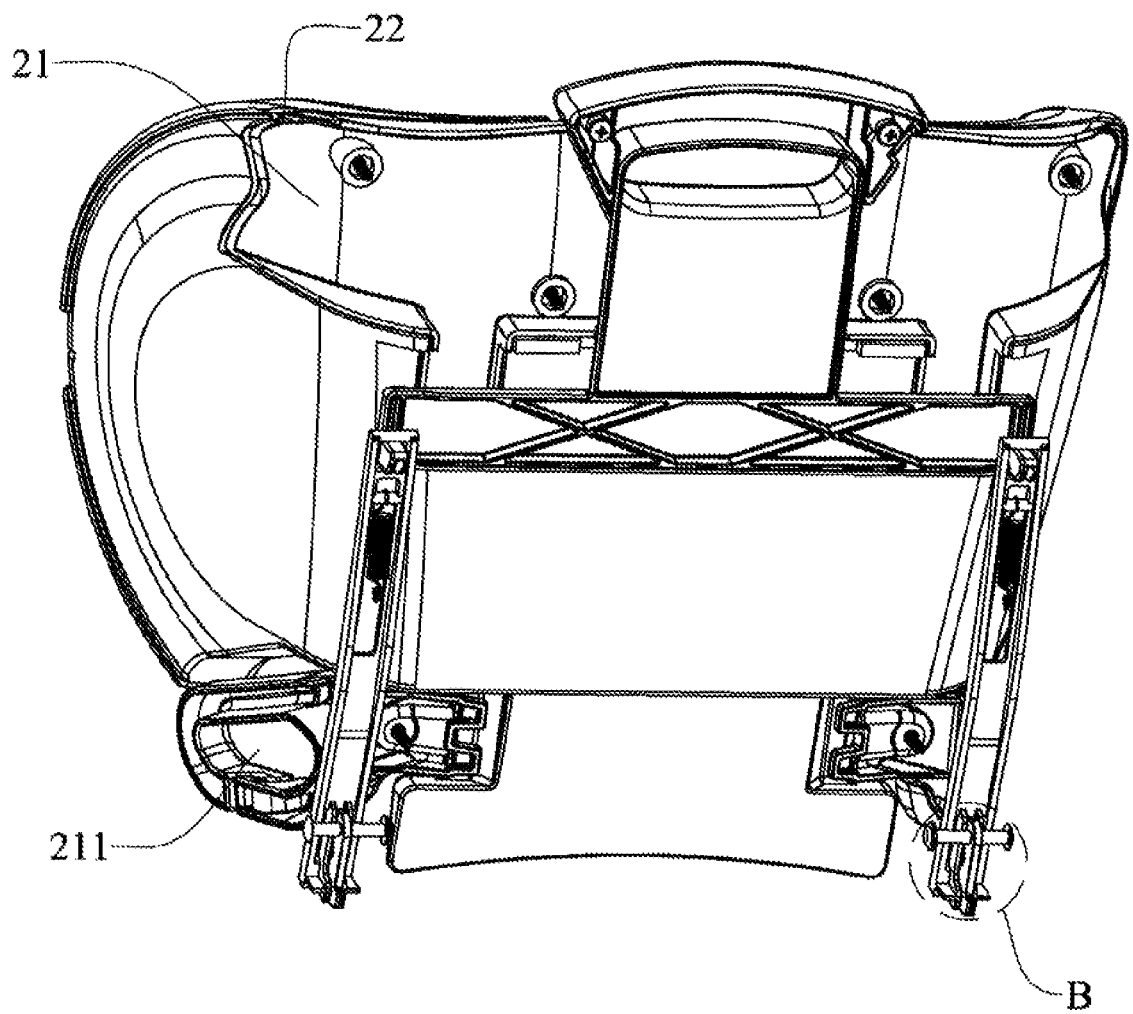
FIG. 14 is a schematic view of a back structure of the headrest in FIG. 6.
Figure 15:
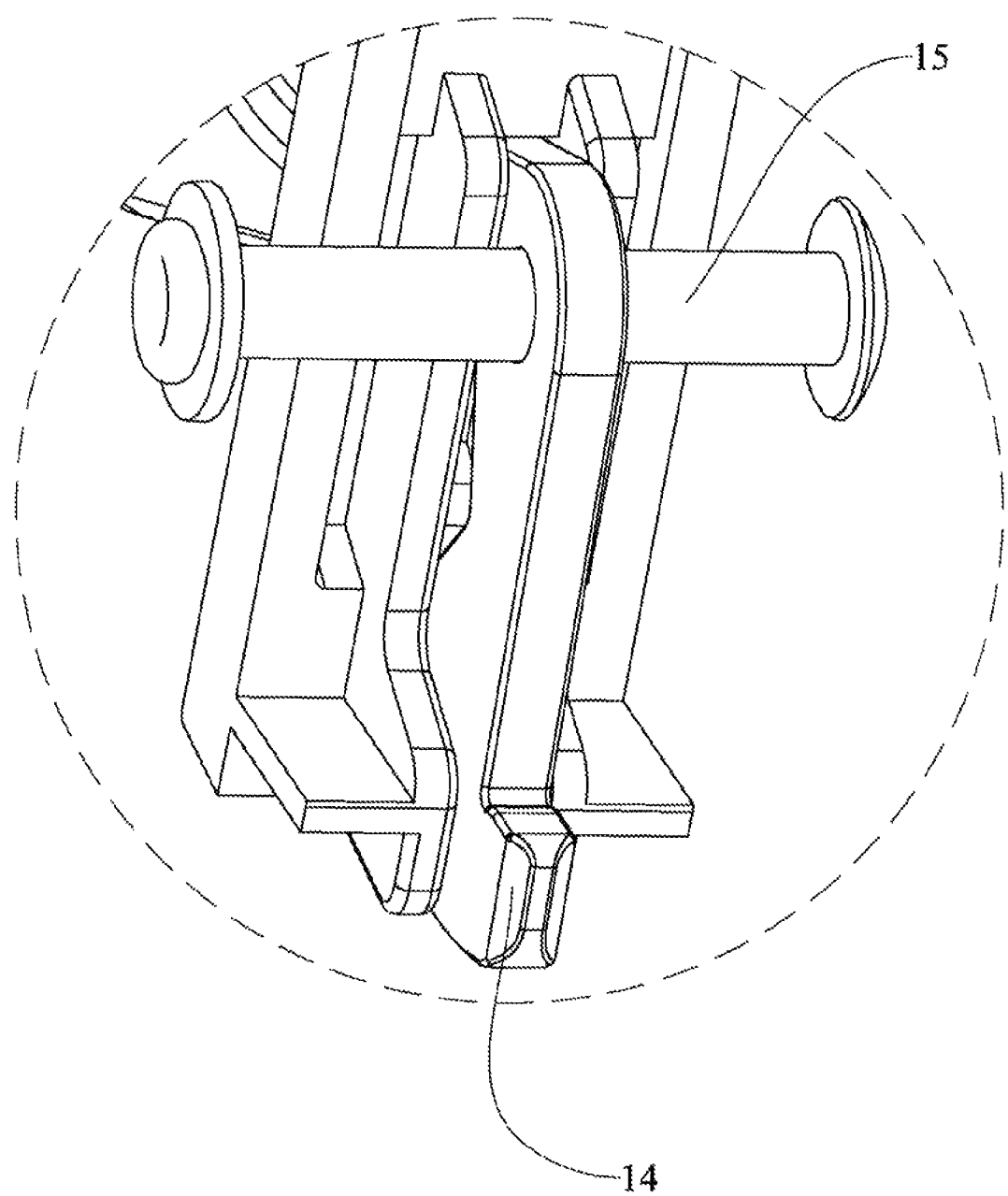
FIG. 15 is an enlarged view of part B in FIG. 14.

Referring to FIGS. 7, 14, and 15, in some alternative embodiments, the child carrier 100 is further provided with a lifting adjustment structure 30 cooperating with the supporting member 11, and the supporting member 11 is provided with a clamp member 14 cooperating with the lifting adjustment structure 30. By the clamp member 14 being clamped at different positions of the lifting adjustment structure 30, the supporting member 11 may be located at different positions of the child carrier 100. Among them, the clamp member 14 may be disposed on the supporting member 11, and when the safety belt adjusting structure 10 is disposed on the headrest 20, the clamp member 14 may also be disposed on the headrest 20. The clamp member 14 is located on a surface where the supporting member 11 or the headrest 20 cooperates with the backrest 40, and the lifting adjustment structure 30 is located on the backrest By cooperation of the clamp member 14 with the lifting adjustment structure 30, the headrest 20 and the supporting member 11 may be located at different positions of the backrest thereby adapting different users. Specifically, the lifting adjustment structure 30 is provided with a plurality of clamp holes 31 which may cooperate with the clamp member 14, and a position of the supporting member 11 may be adjusted by the clamp member 14 being clamped in different clamp holes 31. The clamp member 14 is movably arranged on a back of the headrest 20 or the supporting member 11 with a fixing member 15, and the positions of the headrest 20 and the supporting member 11 on the backrest 40 may be adjusted by the clamp member 14 being clamped in different clamp holes 31. When the clamp member 14 moves away from the clamp holes 31, the headrest 20 and the supporting member 11 are in an unlocked state, and may slide with respect to the backrest 40, so as to adjust the positions of the headrest 20 and the supporting member 11 with respect to the backrest 40. When the headrest 20 and the supporting member 11 are slidably adjusted to an appropriate position, the headrest 20 and the supporting member 11 are locked on the backrest 40 by the clamp member 14 movably clamped in a corresponding clamp hole 31, which is simple in structure and convenient to adjust.

Figure 6:
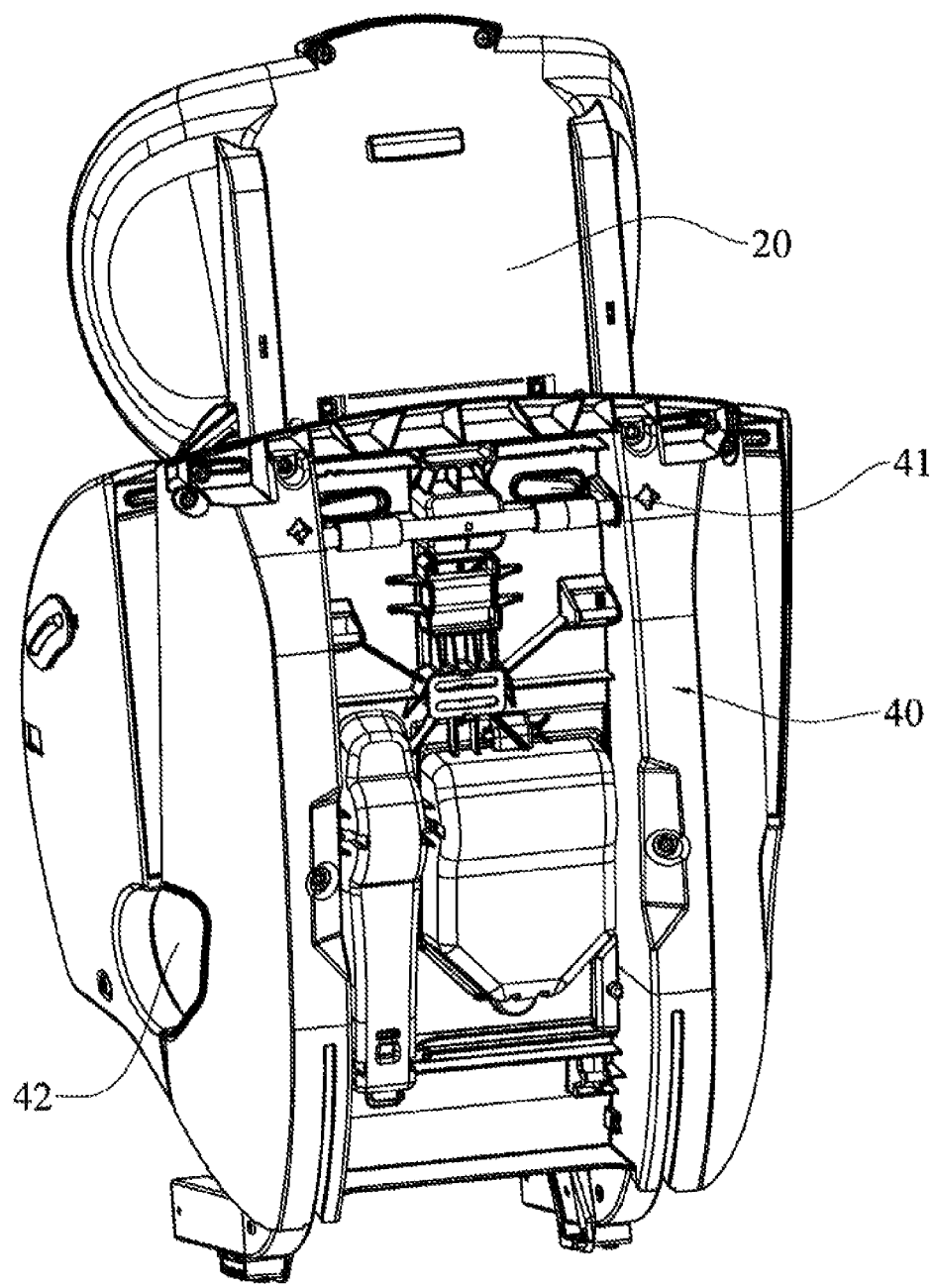
FIG. 6 is a structural schematic view of a back structure of FIG. 1.

Referring to FIG. 6, in some alternative embodiments, the carrier body 101 is provided with a mounting hole 41 for the safety belt to pass through and to be mounted, and the safety belt cooperates with different adjusting portions 12 in the mounting hole 41. It may be understood that the safety belt is fixed on the carrier body 101 and passes through the mounting hole 41 on the backrest 40, such that the safety belt may pass through the mounting hole 41 and cooperate with the adjusting portions 12 on the supporting member 11.

Referring to FIGS. 1 to 12, in some alternative embodiments, each of the adjusting portions 12 has a through slot structure 120 for the safety belt in a horizontal state to move passing through. It may be understood that the safety belt is generally flat and long, and each of the adjusting portions 12 is in a form of the through slot structure 120, so the safety belt in the horizontal state may move to pass through the through slot structure 120. Among them, the through slot structure 120 may be in a long strip shape to match the safety belt in a horizontal state. Specifically, a length of the through slot structure 120 is longer than a width of the safety belt, and a width of the through slot structure 120 is wider than a thickness of the safety belt, such that the safety belt may smoothly move to pass through the through slot structure 120, and the safety belt will not overlap when passing through the through slot structure 120, which is more comfortable to use.

Referring to FIGS. 1 to 12, in some alternative embodiments, the through slot structures 120 of the corresponding adjusting portions 12 in two adjacent rows are communicated with each other. Specifically, the through slot structures 120 of the corresponding adjusting portions 12 in two adjacent rows are communicated with each other with a vertical slot structure 13 for the safety belt in vertical state to slide. It may be understood that the safety belt may slide from one through slot structure 120 to another through slot structure 120 through the vertical slot structure 13, and the safety belt may slide from one through slot structure 120 to another through slot structure 120 without taking out the safety belt, so that the position of the safety belt may be adjusted more conveniently. On the other hand, the vertical slot structure 13 may only allow the safety belt in vertical state to slide through, such that the safety belt cannot slide randomly from one through slot structure 120 to another through slot structure 120, and the safety belt may be stayed more stably in the through slot structure 120. Among them, connections between the through slot structures 120 and the vertical slot structure 13 are arc-shaped arc portions 121, and the specific shape of each of the arc portions 121 may be set according to actual transition situations. The connections between the through slot structures 120 and the vertical slot structure 13 are transited by the arc portions 121, such that sliding of the safety belt may be smoother and friction of the through slot structure 120 and the vertical slot structure 13 to the safety belt may be reduced, thus increasing the service life of the safety belt. Exemplarily, the vertical slot structure 13 may be vertical strip structure, or the vertical slot structure 13 may be another structure such as arc-shaped, as long as the vertical slot structure 13 may allow the safety belt in vertical state passing through. Or, the vertical slot structure 13 may also be semi-circular, and the semi-circular vertical slot structure 13 may provide a larger accommodation space in its middle section, such that the safety belt sliding in the vertical slot structure 13 may be well arranged, and a twisted safety belt may be adjusted by the semi-circular vertical slot structure 13, so the use of the safety belt is more comfortable. Of course, the vertical slot structure 13 may also be another structure with a large accommodation space in its middle section, as long as the safety belt may be adjusted by the accommodation space. A minimum width of the vertical slot structure 13 may be greater than the thickness of the safety belt, such that the safety belt may smoothly slide in the vertical slot structure 13.

Figure 9:
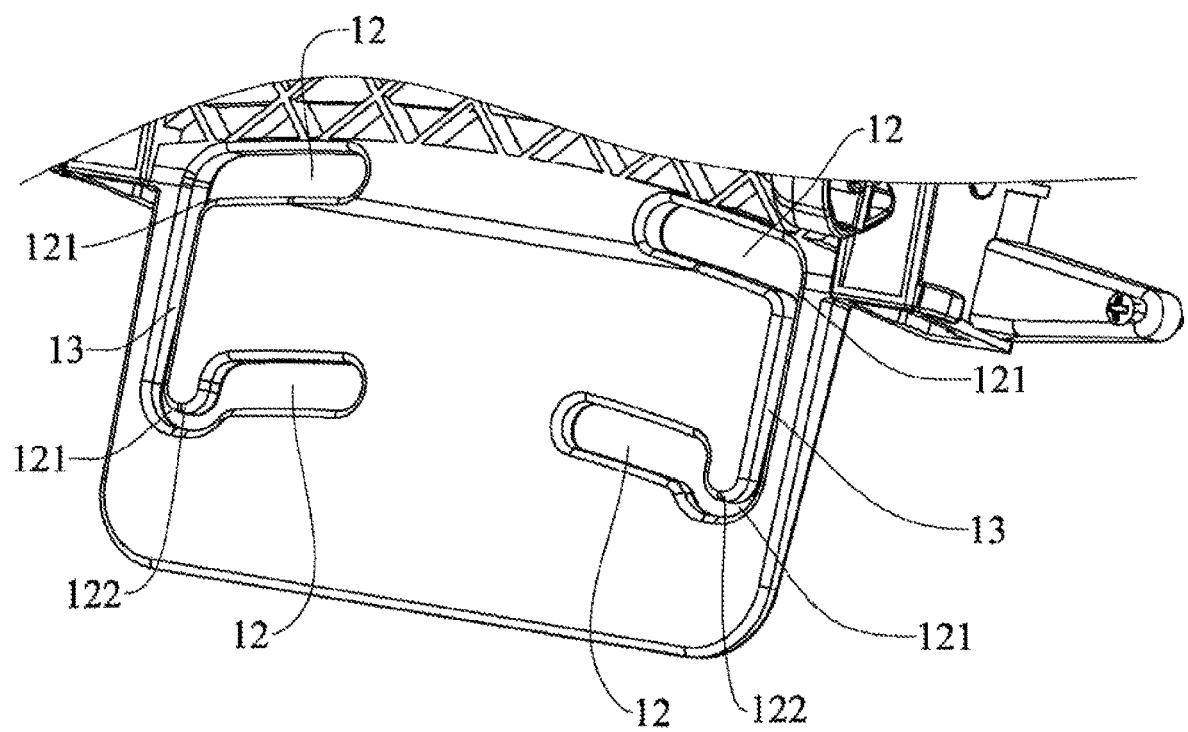
FIG. 9 is a partial structural schematic view of a safety belt adjusting structure in FIG. 8.
Figure 10:
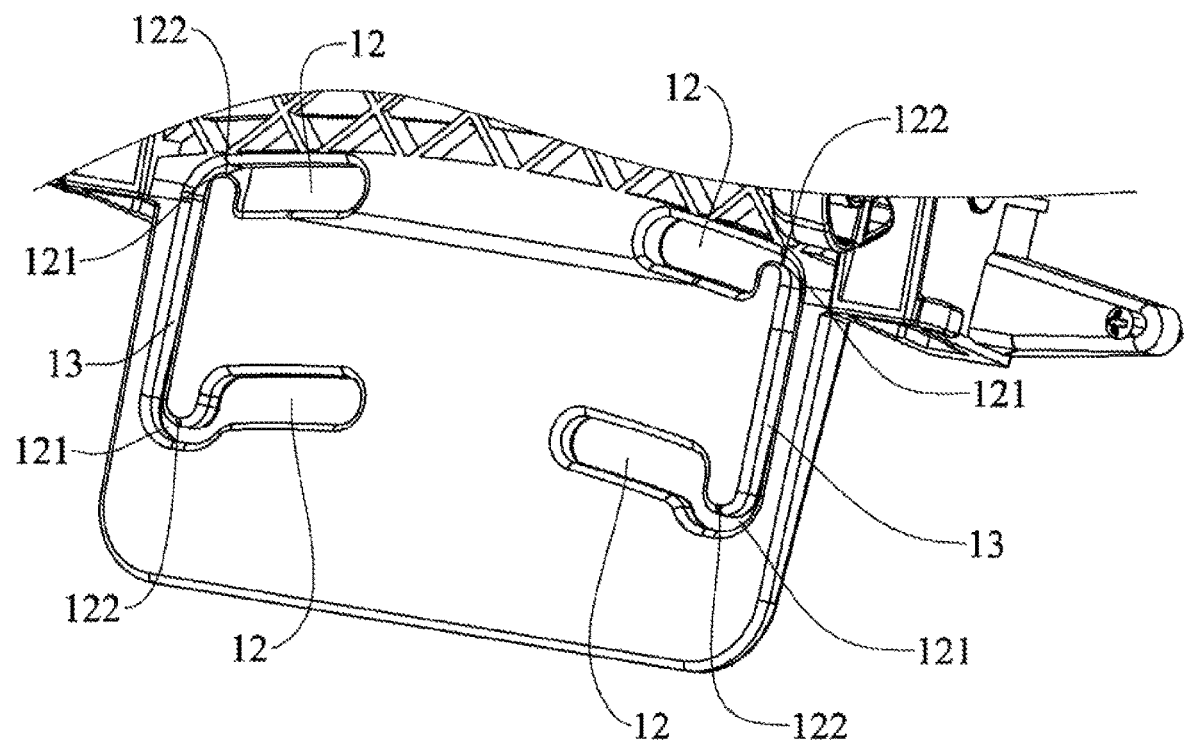
FIG. 10 is a structural schematic view of the safety belt adjusting structure in FIG. 9 according to another embodiment.
Figure 11:
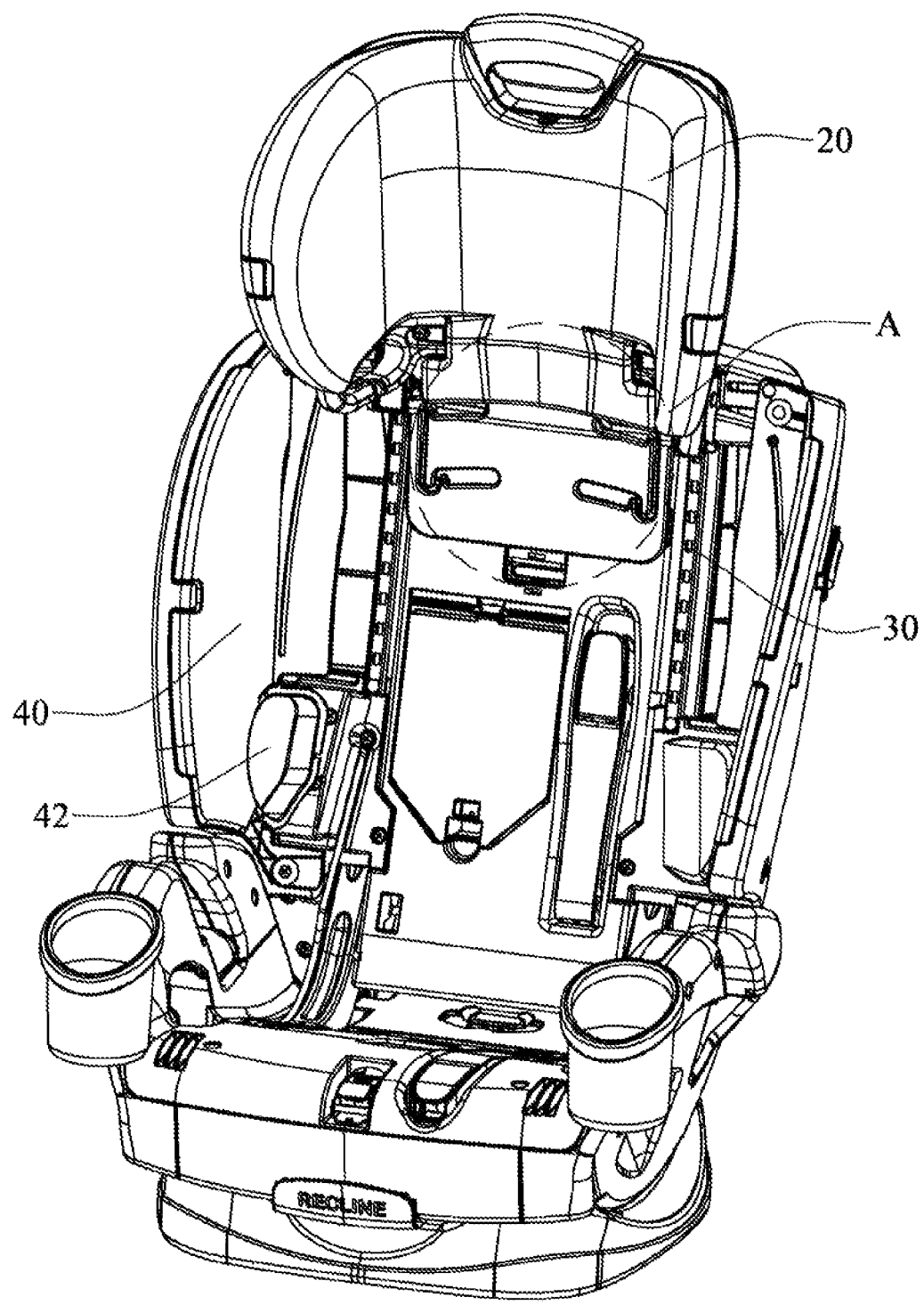
FIG. 11 is a structural schematic view of the child carrier provided by another embodiment of the application.
Figure 12:
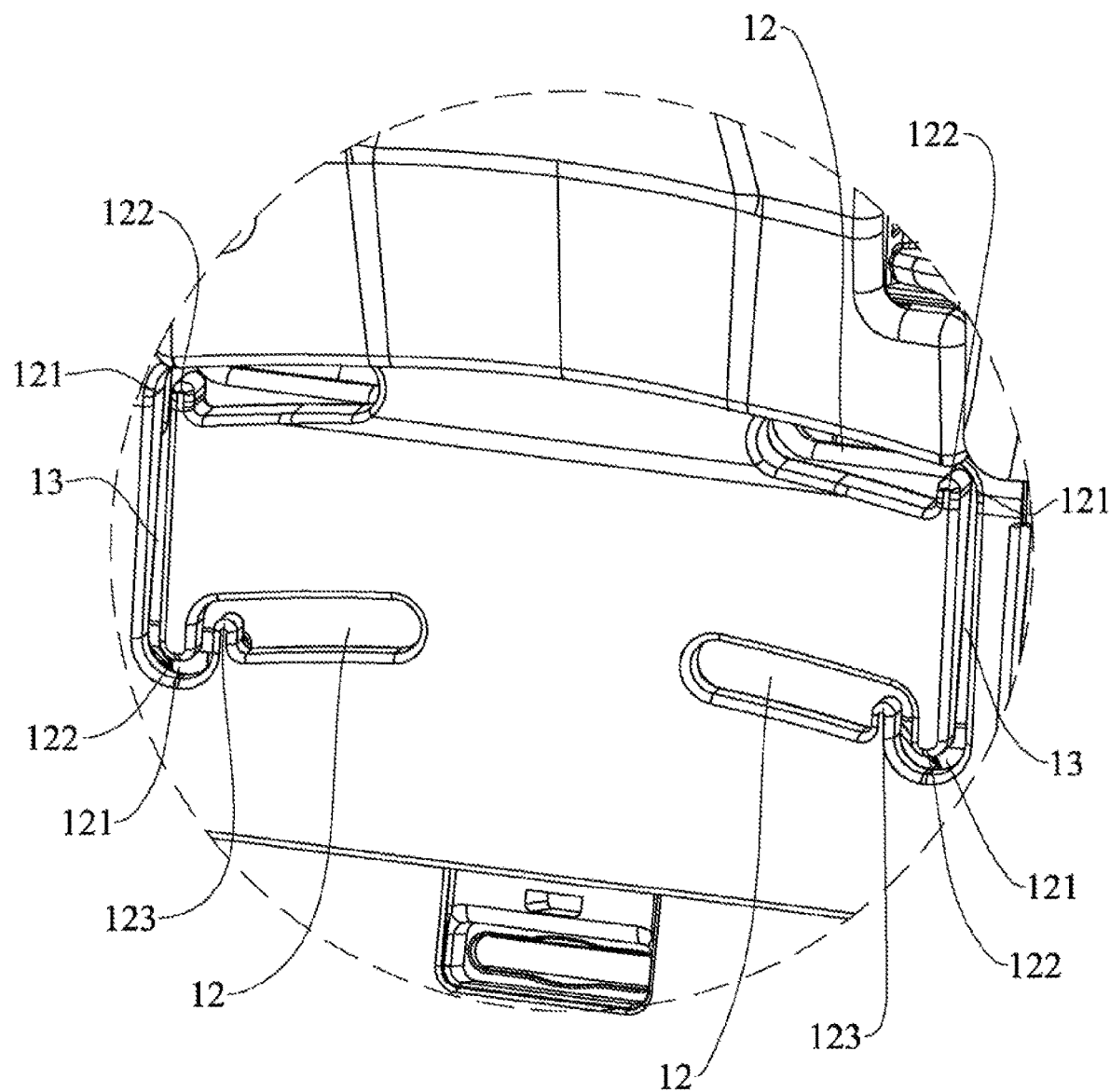
FIG. 12 is an enlarged view of part A in FIG. 11.
Figure 17:
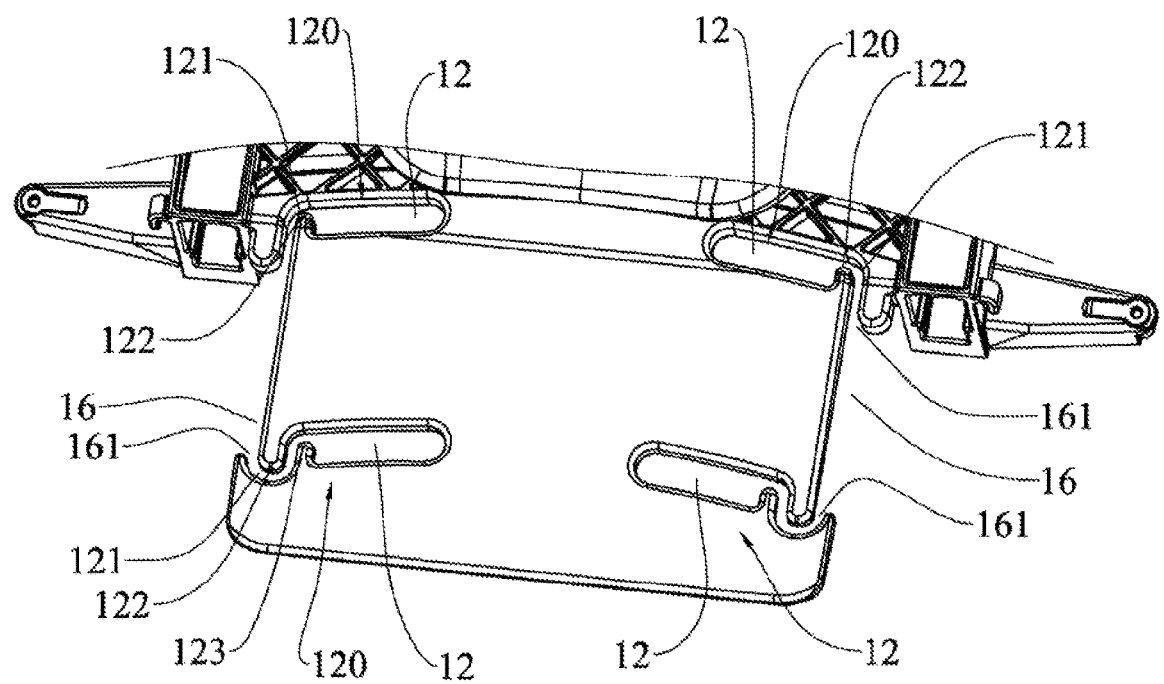
FIG. 17 is a partial structural schematic view of the safety belt adjusting structure in FIG. 16.
Figure 18:
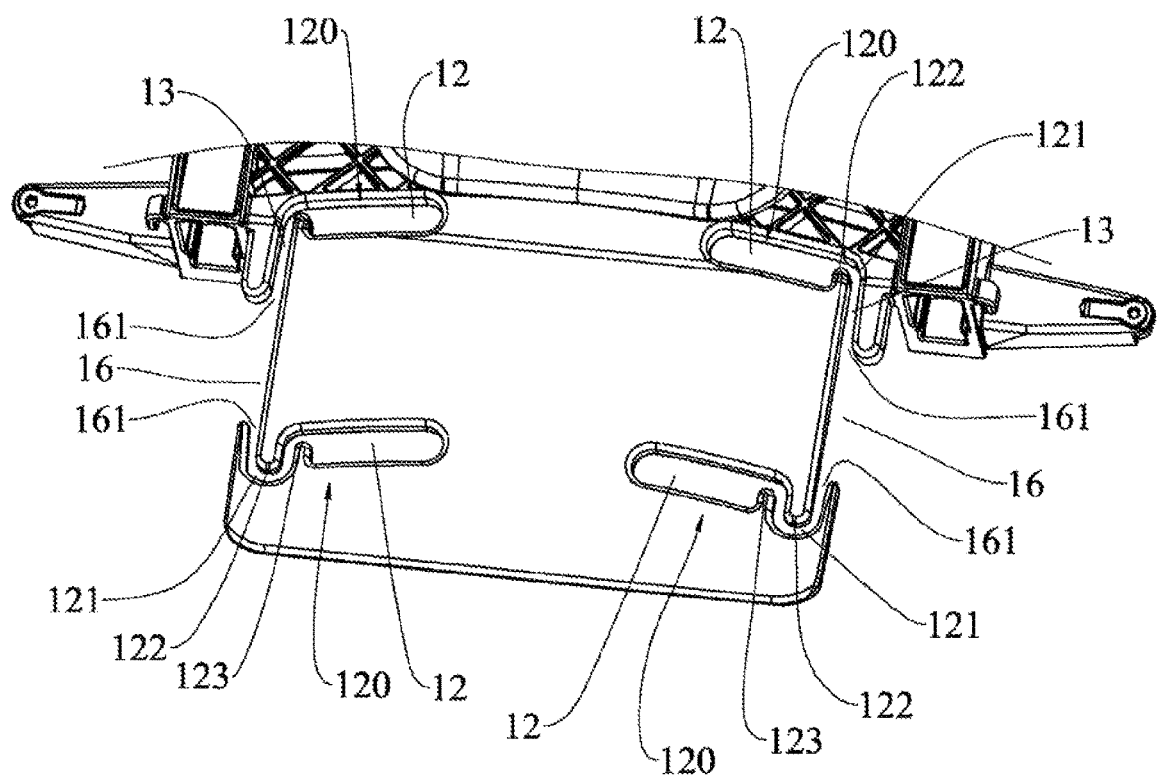
FIG. 18 is a partial structural schematic view of the safety belt adjusting structure in FIG. 16 according to another embodiment.
Figure 19:
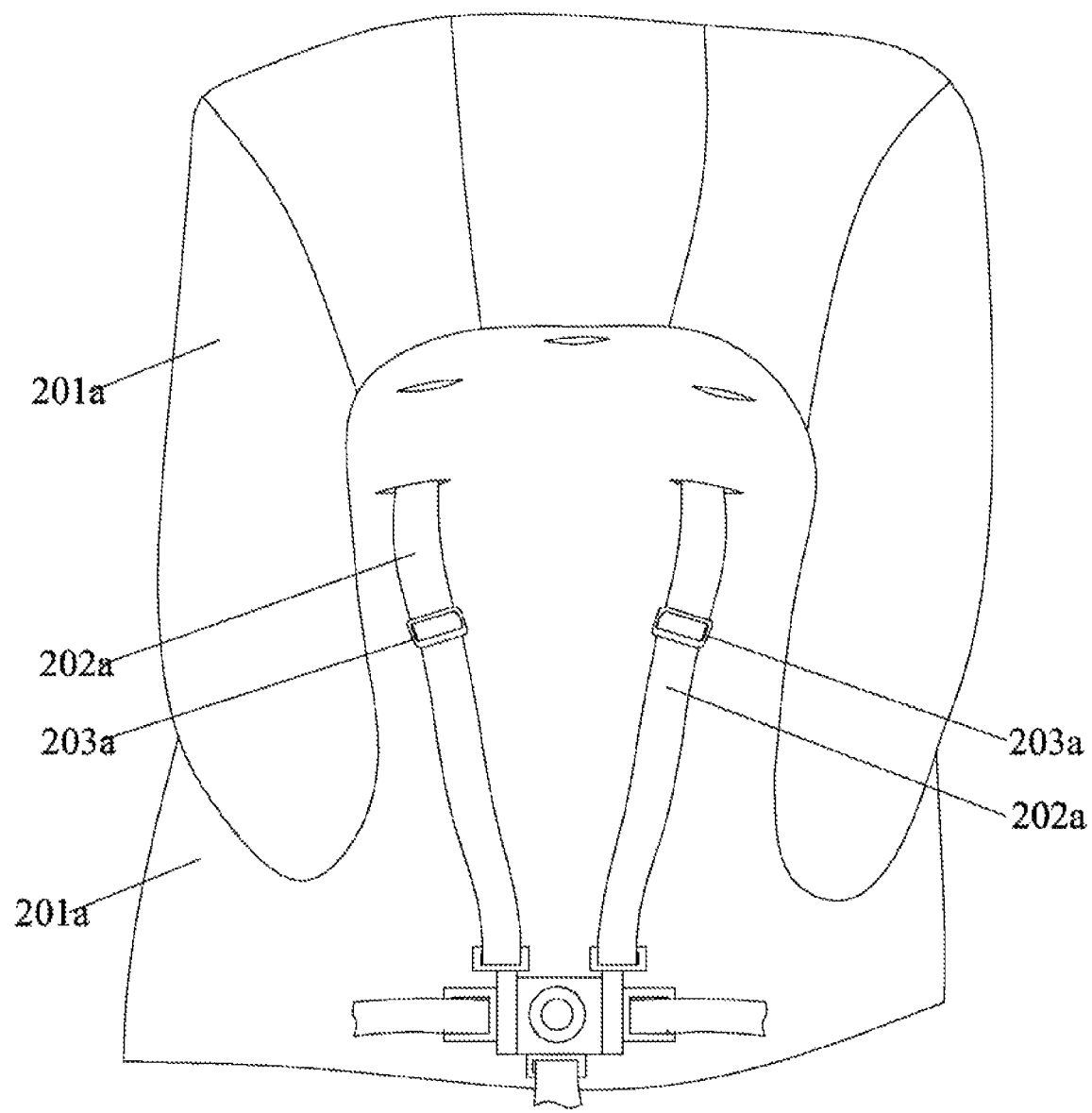
FIG. 19 is a front schematic view of a child safety seat in the technology known to the inventors.

Referring to FIGS. 8 to 12, and FIGS. 17 and 18, in some alternative embodiments, a first limiting portion 122 may be arranged between the through slot structure 120 and the vertical slot structure 13 or the opened portion 16, and the sliding of the safety belt in the through slot structure 120 is limited by the first limiting portion 122. Furthermore, a second limiting portion 123 may be arranged between the through slot structure 120 and the first limiting portion 122, and the sliding of the safety belt in the through slot structure 120 is limited by the second limiting portion 123. The protruding height of the first limiting portion 122 and/or the second limiting portion 123 in each of the adjusting portions 12 is higher than the thickness of the safety belt, so that the safety belt may be placed in corresponding adjusting portion 12 more stably and will not slide out of the corresponding adjusting portion 12. In one embodiment, as shown in FIG. 9, first limiting portion 122 with curved structure may be arranged between some of the through slot structures 120 and some of the vertical slot structures 13, and the first limiting portion 122 protrudes below the through slot structure 120, such that the safety belt will not slide randomly when located in one of the through slot structures 120, and the structure is more stable. That is, the first limiting portion 122 are arranged between some of the through slot structures 120 and some of the vertical slot structures 13, but not arranged between other through slot structures 120 and other vertical slot structures 13. In another embodiment, as shown in FIG. 10, the first limiting portion 122 is arranged between each of the through slot structures 120 and each of the vertical slot structures 13, such that the safety belt will not slide randomly when located in one of the through slot structures 120, and the structure is more stable. In some embodiments, as shown in FIG. 12, the second limiting portion 123 may be further arranged between the through slot structure 120 and the first limiting portion 122. By the arrangement of the second limiting portion 123, the safety belt may be reinforced to stay in one of the through slot structures 120, such that the safety belt may stay more stably in one of the through slot structures 120, and the structure is more stable. In a further embodiment, as shown in FIG. 17, the first limiting portion 122 may be arranged between the through slot structure 120 and the opened portion 16, and the second limiting portion 123 may be further arranged between the first limiting portion 122 and the through slot structure 120. In addition, as shown in FIG. 18, the vertical slot structure 13 may be arranged between the through slot structure 120 and the opened portion 16, and the first limiting portion 122 may be arranged between the through slot structure 120 and the vertical slot structure 13, and further, the second limiting portion 123 may be arranged between the first limiting portion 122 and the through slot structure 120. It may be understood that each adjusting portion 12 may be directly connected to the corresponding vertical slot structure 13 or the corresponding opened portion 16. The first limiting portion 122 may be arranged between each adjusting portion 12 and the corresponding vertical slot structure 13 or the corresponding opened portion 16, so as to limit the movement of the safety belt in the adjusting portions 12. Furthermore, both the first limiting portion 122 and the second limiting portion 123 may be arranged between each adjusting portion 12 and the corresponding vertical slot structure 13, such that the safety belt may more stably stay in one of the adjusting portions 12. The shape of the second limiting portion 123 may be set according to actual use requirements. Exemplarily, the shape of the second limiting portion 123 may have a wavy structure, and the specific number of convex parts and concave parts in the wavy structure is not specifically limited.

Figure 16:
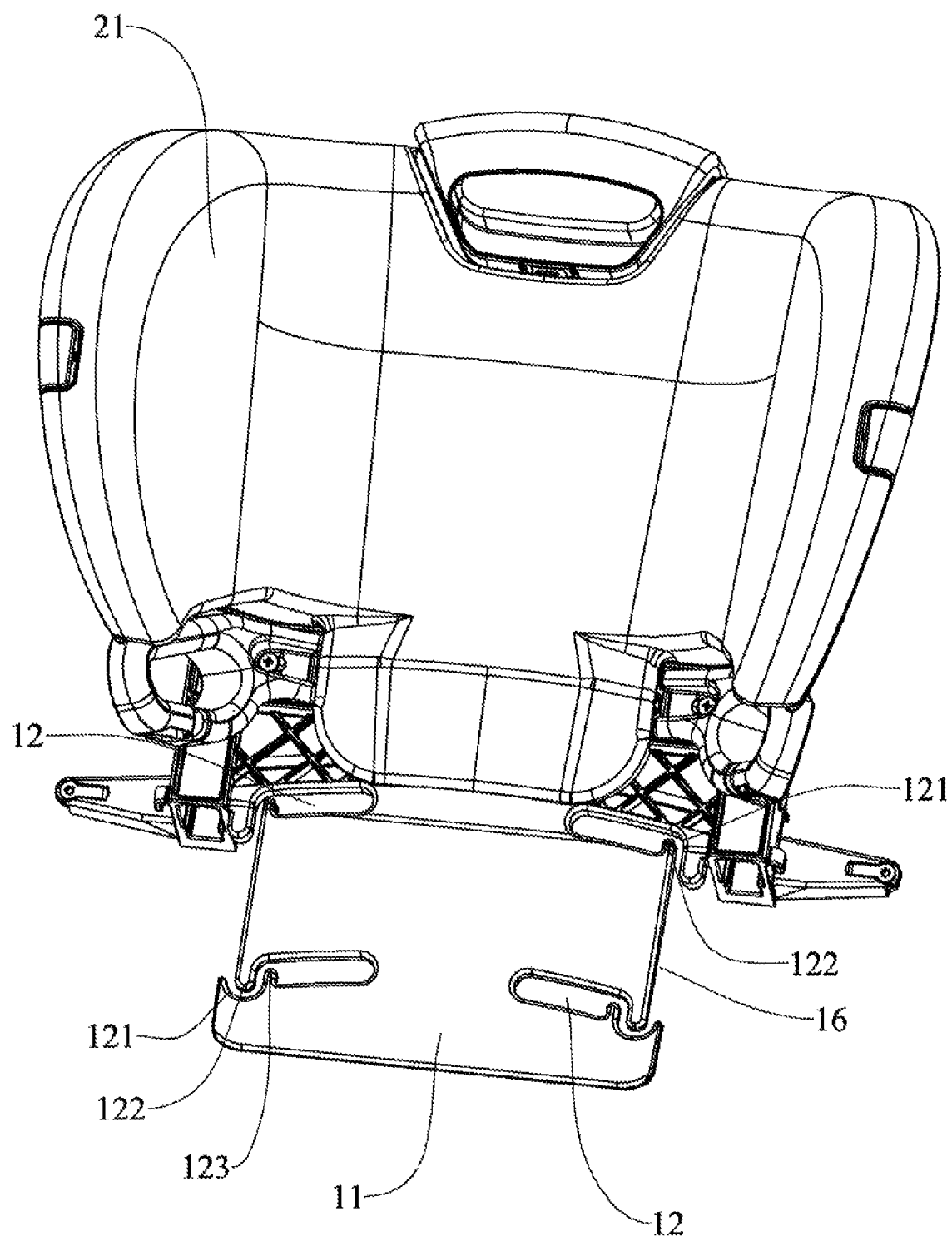
FIG. 16 is a structural schematic view of the headrest provided by another embodiment of the application.

Referring to FIGS. 16 and 18, in some alternative embodiments, a side of the supporting member 11 is provided with the opened portion 16, and the opened portion 16 are communicated with at least two adjacently arranged through slot structures 120, such that the safety belt may be transferred between different adjusting portions 12 through the opened portion 16. It may be understood that the opened portion 16 may be directly arranged on a side of the supporting member 11 and communicated with a plurality of the adjusting portions 12 on the same side. The adjusting portions 12 in the same row generally include two adjusting portions 12 for respectively accommodating left and right shoulder straps, and the two adjusting portions 12 in the same row are not communicated with each other. The two adjusting portions 12 in the same row are respectively communicated with different opened portion 16 on the left and right sides. The safety belt may be more conveniently transferred between the different adjusting portions 12 on the same side through the opened portion 16, which makes the operation more convenient. On the other hand, by arranging the opened portion 16 on the supporting member 11, the molding process may be simpler and the materials may be saved, moreover, the whole supporting member 11 may be lighter, thus effectively reducing the cost. The safety belt may also be more conveniently placed in the adjusting portions 12 through the opened portion 16, or the safety belt may be more conveniently detached from the adjusting portions 12 through the opened portion 16. In some other embodiments, the two adjacent rows of corresponding adjusting portions 12 may be communicated with each other through the vertical slot structure 13, and the opened portion 16 communicating with the vertical slot structure 13 are arranged on a side of the supporting member 11 (as shown in FIG. 18). That is, between the opened portion 16 and the through slot structure 120, the vertical slot structure 13 are further provided for the safety belt in vertical state to slide. After a state that the safety belt is properly adjusted through the vertical slot structure 13, the safety belt may more smoothly enter the through slot structure 120, so as to prevent the safety belt from being twisted or wrinkled during sliding. The opened portion 16 is communicated with at least two through slot structures 120 through the vertical slot structure 13. The adjusting portions 12 located at the same side may be communicated with each other through the vertical slot structure 13, and the vertical slot structure 13 is provided with the opened portion 16, such that the safety belt may be transferred between different adjusting portions 12 more conveniently, and a twisted safety belt may be adjusted with the arrangement of the opened portion 16 well enough, which makes the operation more convenient.

Figure 4:
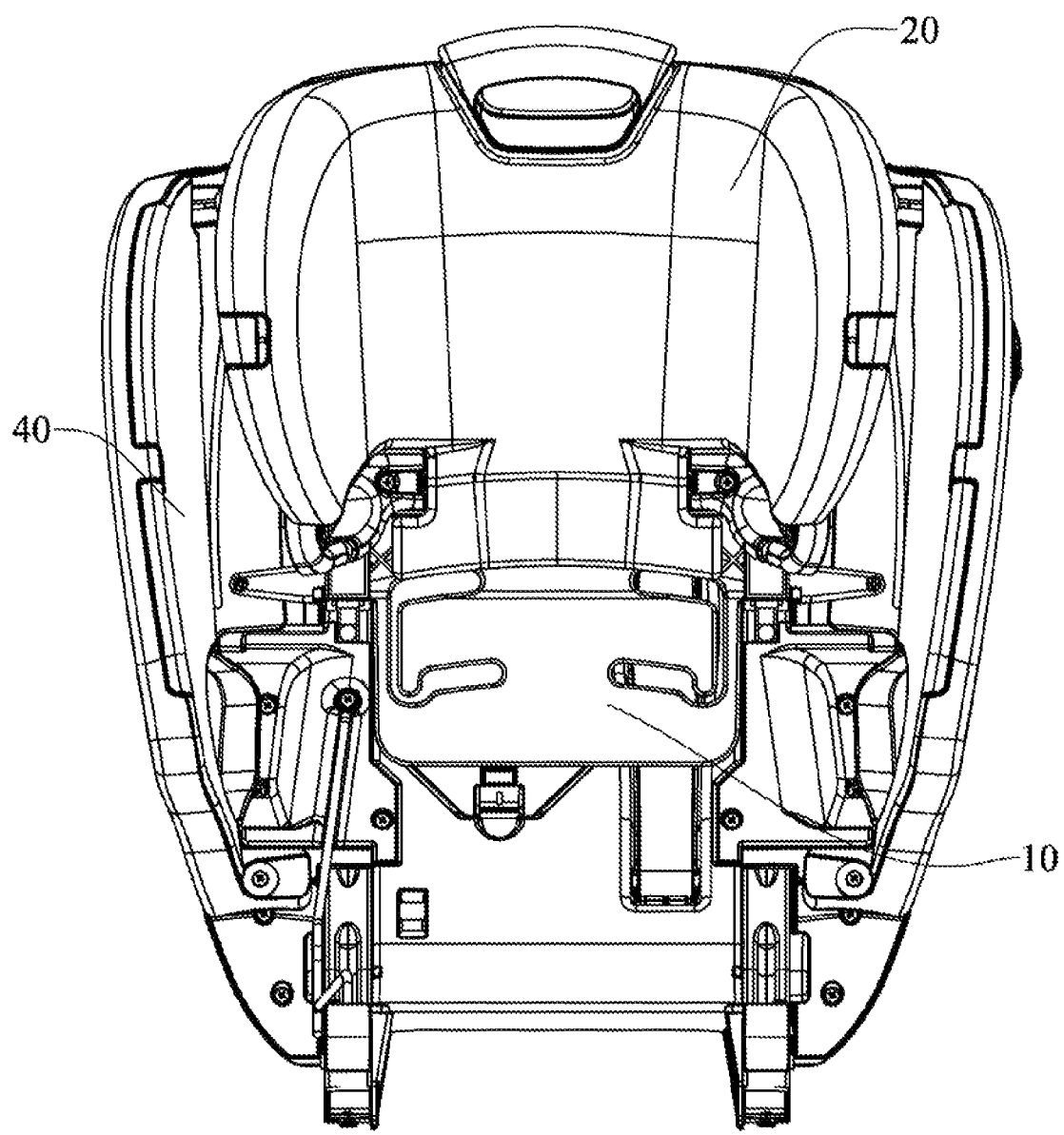
FIG. 4 is a structural schematic view in a first state of FIG. 1.
Figure 5:
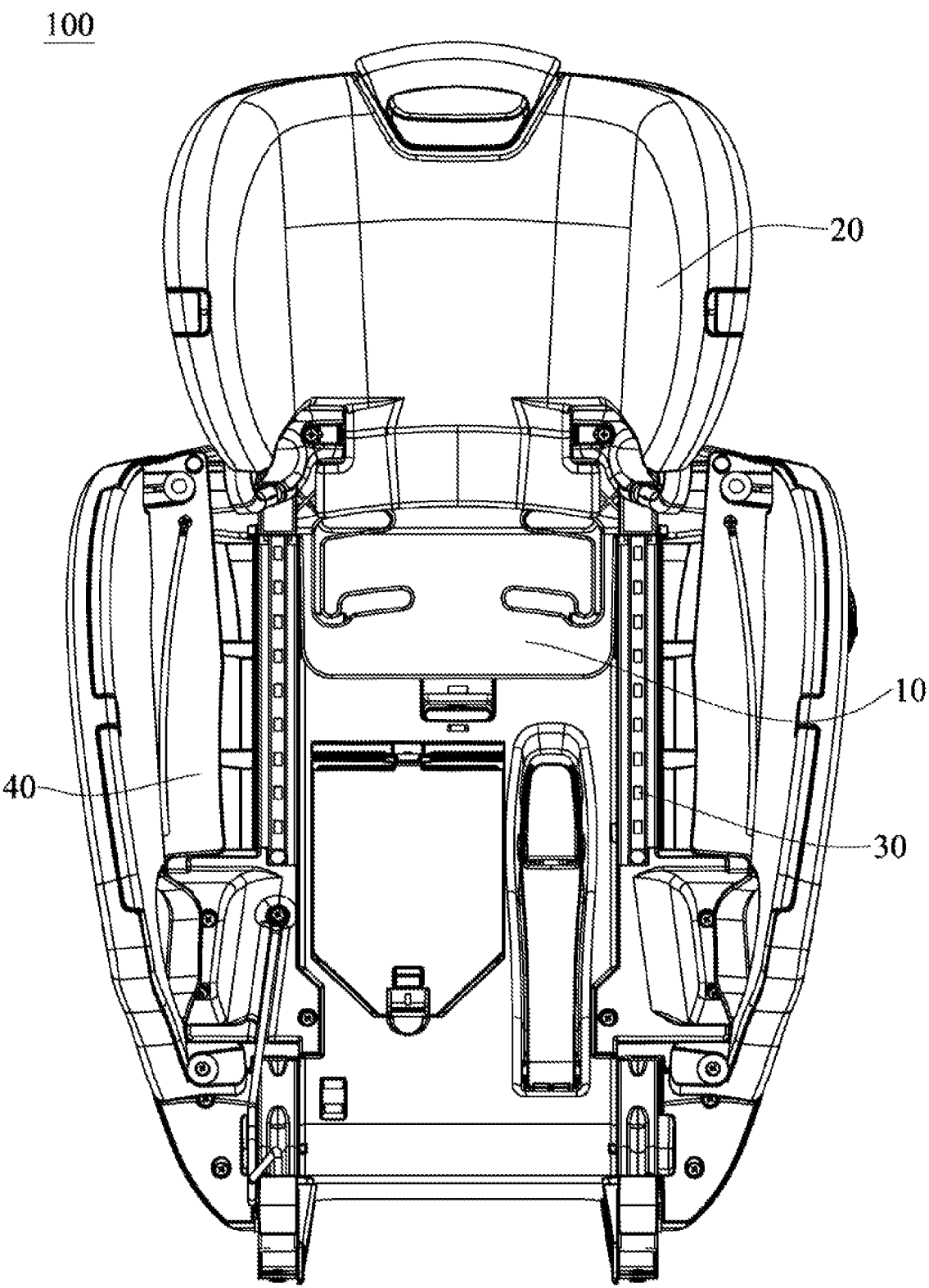
FIG. 5 is a structural schematic view in a second state of FIG. 1.

Referring to FIGS. 17 and 18, in some alternative embodiments, a guiding portion 161 is disposed between the opened portion 16 and one of the adjusting portions 12. The guiding portion 161 has a structure shaping from wide to narrow gradually along a direction in which the opened portion 16 enters the adjusting portions 12. In case that the vertical slot structure 13 is provided, the guiding portion 161 is arranged between the vertical slot structure 13 and the opened portion 16. It may be understood that the guiding portion 161 has a large opening at an end close to the opened portion 16, such that the safety belt may enter the vertical slot structure 13 or the adjusting portions 12 more conveniently. Among them, if a connection between the guiding portion 161 and the opened portion 16 is arc-shaped, so an arc-shaped transition is formed between the opened portion 16 and the guiding portion 161, the safety belt may be prevented from being scratched. Referring to FIGS. 4 and 5, in some alternative embodiments, the safety belt adjusting structure 10 is arranged on the headrest 20, and the safety belt adjusting structure 10 rises and falls along with rising and falling of the headrest 20, so as to be better adapted for different users. In this embodiment, each adjusting portion 12 with the through slot structure 120 is arranged on the supporting member 11. The adjusting portions 12 are arranged in two rows for two safety belts to pass through, and the adjusting portions 12 are arranged in two rows of different heights, so that the safety belts may be adapted for children of different ages and different use requirements. Exemplarily, the child carrier 100 may be an automobile safety seat. When the headrest 20 is at a lower position (as shown in FIG. 4), the child carrier 100 is adapted for a smaller child. The angle of the child carrier 100 may be adjusted such that the smaller child may sleep or lie in the child carrier 100. At this time, the safety belts are required to be in the adjusting portions 12 at a lower position, so as to be prevented from strangling the child. When the headrest 20 is at a higher position (as shown in FIG. 5), the child carrier 100 is adapted for a larger child, and at this time, the safety belts are required to be in the adjusting portions 12 at a higher position.

As shown in FIGS. 1 to 18, the child carrier 100 of the application includes the carrier body 101 and the safety belt adjusting structure 10 disposed on the carrier body 101. The safety belt adjusting structure 10 includes the supporting member 11 movably arranged on the carrier body 101, and the plurality of rows of adjusting portions 12 with different heights are arranged on the supporting member 11, moreover, two adjacent rows of the adjusting portions 12 are communicated with each other, such that the safety belt may cooperate with different adjusting portions 12 without disassembly. Specifically, the carrier body 101 is provided with the headrest 20, and the supporting member 11 is linked with the headrest 20, such that the supporting member 11 may be brought to move to a proper position via the movement of the headrest 20, and the position of the safety belt is more adapted for the user. The child carrier 100 of the application may be adapted for children of various sizes and habitus, and the safety belt may be convenient to adjust and more comfortable to use. The safety belts adjusting structure 10 on the child carrier 100 may not only adjust the position of the safety belt by the supporting member 11, but also adjust the position of the safety belt with the cooperation of different adjusting portions 12 on the supporting member 11 with the safety belt, which is simple in structure, convenient in operation, and better in adaptability.

Figure 20:
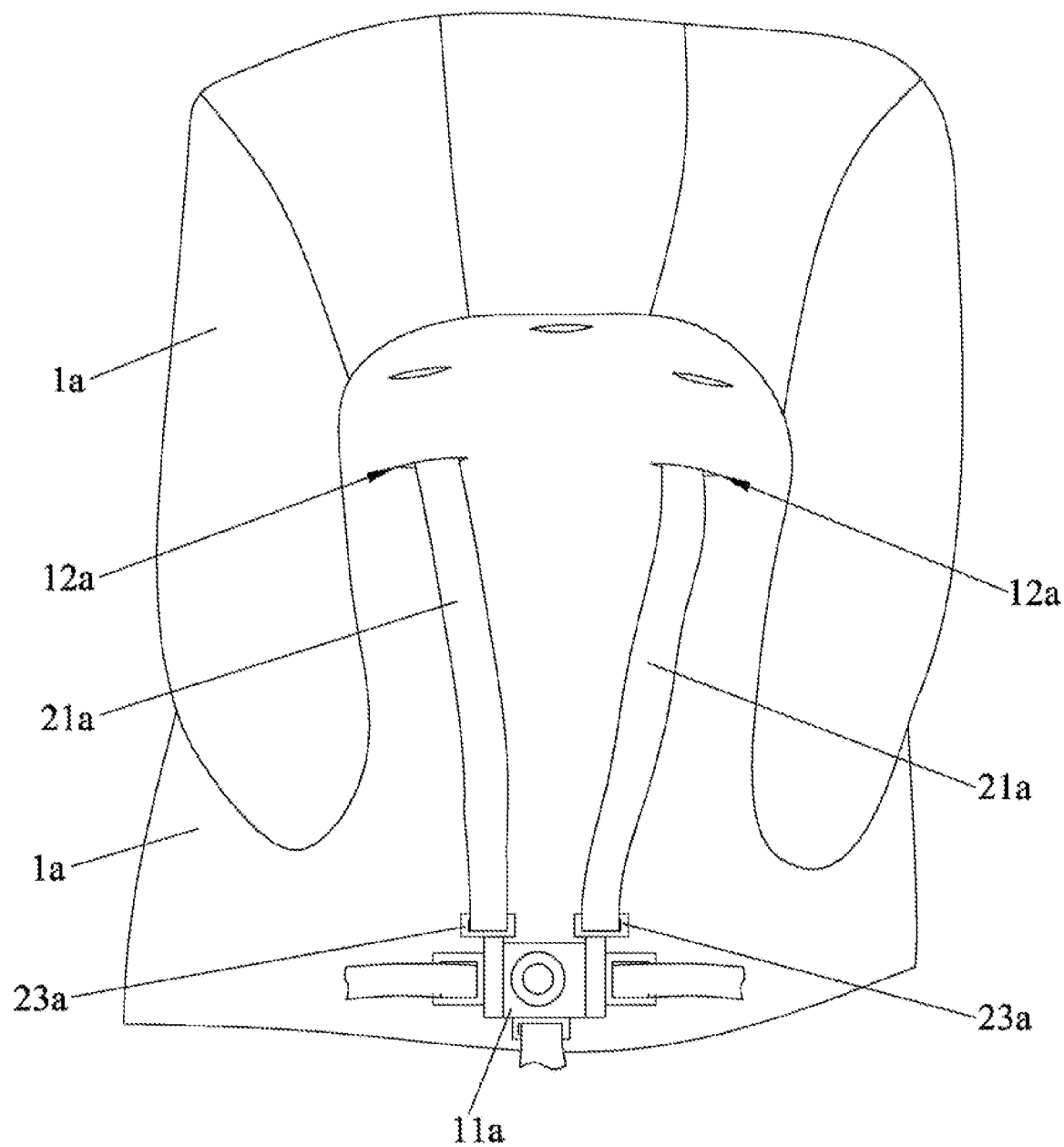
FIG. 20 is a front schematic view of the child safety seat of the application.
Figure 21:
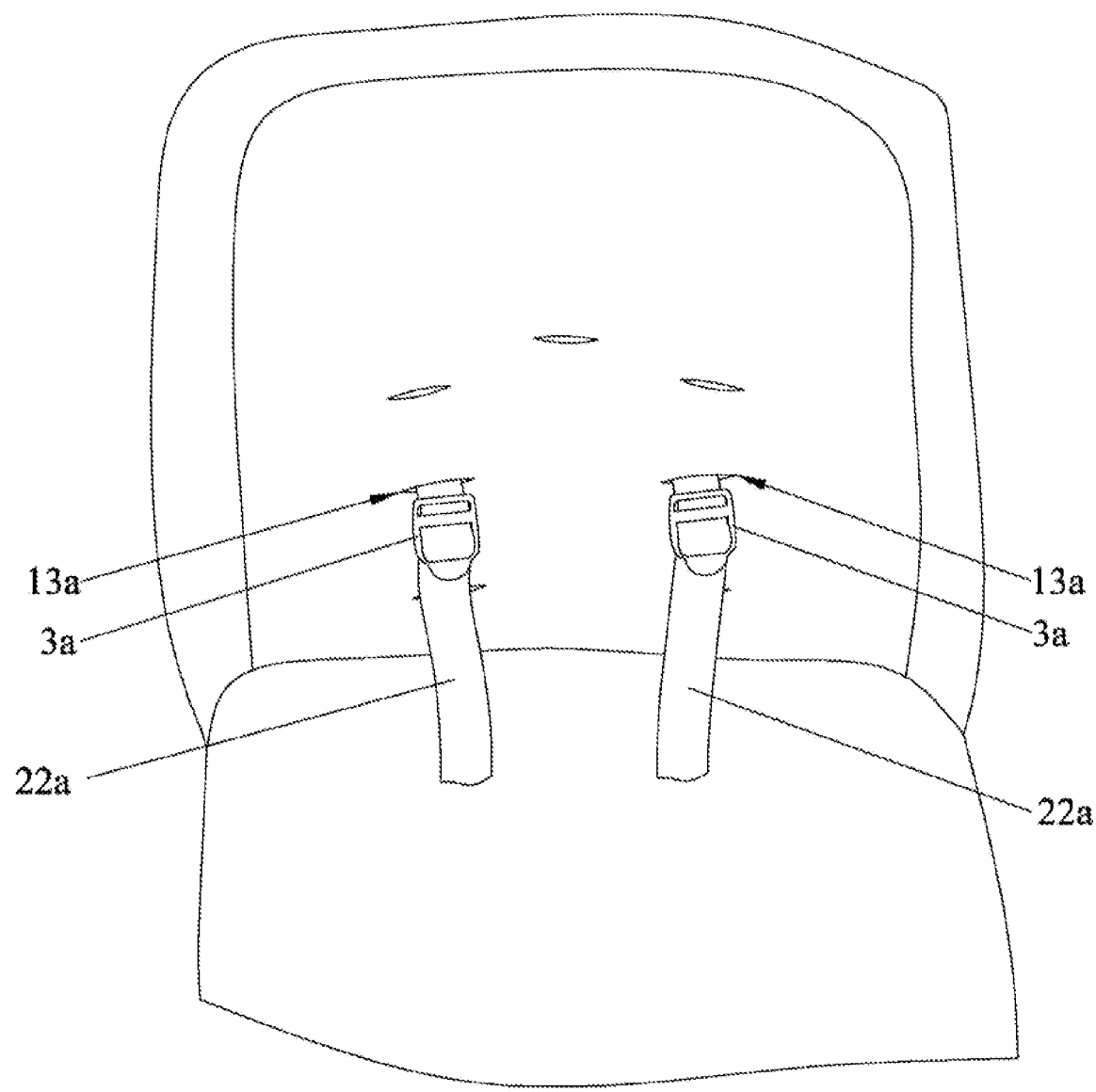
FIG. 21 is a back schematic view of the child safety seat of the application.
Figure 22:
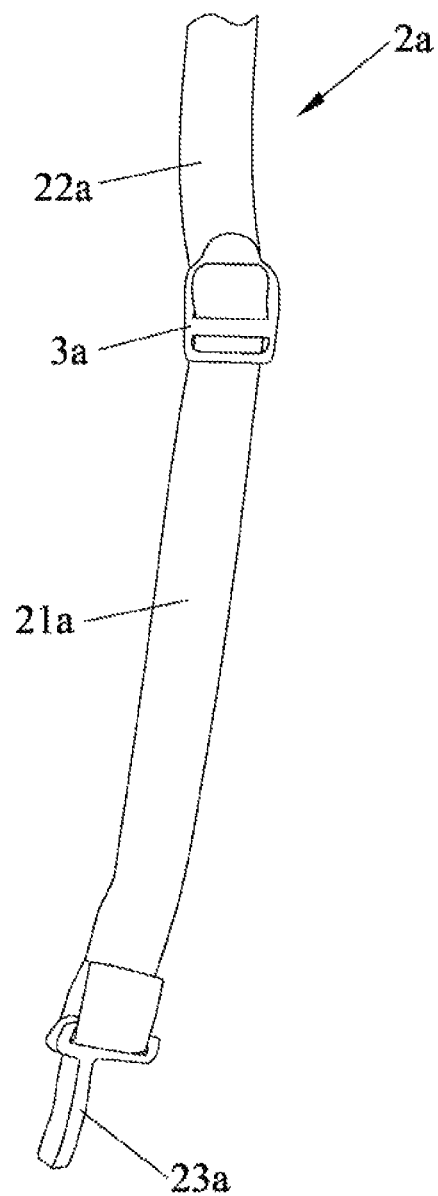
FIG. 22 is a structural schematic view of the safety belt of the child safety seat of the application.

Referring to FIGS. 20 to 22, the child safety seat 100a of the application includes a seat body 1a, a safety belt 2a, and an adjusting buckle 3a. The safety belt 2a is passed through the seat body 1a, and the safety belt 2a has a front belt portion 21a located in front of the seat body 1a and a rear belt portion 22a located behind the seat body 1a. The adjusting buckle 3a is arranged on the rear belt portion 22a and is used for adjusting a length of front belt portion 21a. In this embodiment, the adjusting buckle 3a is an 8-shaped buckle, and the rear belt portion 22a is passed through the adjusting buckle 3a, but not limited thereto. Specifically, the adjusting buckle 3a abuts against a back of the seat body 1a, so as to facilitate operating the adjusting buckle 3a and the rear belt portion 22a to adjust a length of the front belt portion 21a. In this embodiment, the number of the adjusting buckle 3a is one, and there is no adjusting buckle 3a on the front belt portion 21a, so that the comfort of the child in using the safety belt 2a is improved, furthermore, by arranging the adjusting buckle 3a on the rear belt portion 22a located behind the seat body 1a, the length of the safety belt 2a may also be adjusted while the safety belt 2a is fixed.

Referring to FIGS. 20 and 21, the number of the safety belt 2a is two, and the two safety belts 2a are arranged on the seat body 1a at intervals. The two safety belts 2a are arranged symmetrically, and the left and right safety belts 2a are used to restrain the child, thus fully ensuring the safety of the child riding.

Referring to FIG. 20, a free end of the front belt portion 21a is provided with a first fixing connection member 23a. The seat body 1a is provided with a second fixing connection member 11a cooperatively connected to the first fixing connection member 23a. Among them, one of the first fixing connection member 23a and the second fixing connection member 11a is a male buckle, and the other of the first fixing connection member 23a and the second fixing connection member 11a is a female buckle. In this embodiment, the first fixing connection member 23a is a female buckle, and the second fixing connection member 11a is a male buckle. The first fixing connection members 23a on the two front belt portions 21a may be respectively clamped to the second fixing connection member 11a.

Referring to FIGS. 20 and 21, the seat body 1a is provided with a passage (not shown) for the safety belt 2a to pass through. The passage forms a front opening 12a on a front side of the seat body 1a, and the passage forms a rear opening 13a on a rear side of the seat body 1a.

In conclusion, in the child safety seat 100a of the application, the adjusting buckle 3a is fixed to the safety belt 2a by arranging the adjusting buckle 3a on the rear belt portion 22a of the safety belts 2a behind the seat body 1a, and the length of the front belt portion 21a may be adjusted by the adjusting buckle 3a behind the seat body 1a, accordingly, the arrangement may prevent the front belt portion 21a of the safety belt 2a from slipping loose during use, and improve the safety of child safety seat 100a. Meanwhile, since the front belt portion 21a of the safety belt 2a does not have the adjusting buckle 3a provided thereon, so that the comfort of children in using the child safety seat 100a may be improved.

What disclosed above is merely preferable examples of the application, and cannot be used to limit the scope of the application, so all the equivalent changes made according to the claims of the application are within the scope of the application.

What is claimed is:

1. A safety belt adjusting structure adapted for adjusting a position of a safety belt of a child carrier corresponding to shoulders of a child, wherein the safety belt adjusting structure comprises
   a supporting member movably arranged on the child carrier, wherein the child carrier is further provided with a lifting adjustment structure cooperating with the supporting member, and the supporting member is provided with a clamp member cooperating with the lifting adjustment structure, such that the supporting member is able to be located at different positions of the child carrier by the clamp member being clamped to different positions of the lifting adjustment structure, and
   a plurality of rows of adjusting portions having different heights are arranged on the supporting member for accommodating the safety belt, such that the position of the safety belt corresponding to the shoulders of the child is adjusted by movement of the supporting member and cooperation of the safety belt with the adjusting portions having different heights.

2. The safety belt adjusting structure according to claim 1, wherein the child carrier is provided with an adjustable headrest, and the safety belt adjusting structure is linked with the headrest, wherein the headrest brings the supporting member to move up and down on the child carrier.

3. The safety belt adjusting structure according to claim 2, wherein the supporting member is connected to the headrest, or the supporting member and the headrest are in an integral structure.

4. The safety belt adjusting structure according to claim 1, wherein the child carrier is provided with a mounting hole for the safety belt to pass through and be mounted, and the safety belt cooperates with different adjusting portions in the mounting hole.

5. The safety belt adjusting structure according to claim 1, wherein the lifting adjustment structure is provided with a plurality of clamp holes cooperating with the clamp member, and the position of the supporting member is adjusted by the clamp member being clamped to different clamp holes.

6. The safety belt adjusting structure according to claim 1, wherein each of the adjusting portions is in a form of through slot structure for the safety belt in a horizontal state to move passing through, wherein the through slot structures of the adjusting portions in two adjacent rows are communicated with each other.

7. The safety belt adjusting structure according to claim 6, wherein an opened portion is arranged on a side of the supporting member, and the opened portion is communicated with at least two through slot structures arranged adjacently, such that the safety belt is transferred between different adjusting portions through the opened portion.

8. The safety belt adjusting structure according to claim 6, wherein the through slot structures of the adjusting portions in two adjacent rows are communicated with each other by a vertical slot structure for the safety belt in vertical state to slide.

9. The safety belt adjusting structure according to claim 8, wherein a connection between each of the through slot structures and the vertical slot structure is arc-shaped, wherein a length of each of the through slot structures is longer than a width of the safety belt.

10. The safety belt adjusting structure according to claim 8, wherein a first limiting portion is further arranged between each of the through slot structures and the vertical slot structure, and sliding of the safety belt in the through slot structures are limited by the first limiting portion.

11. The safety belt adjusting structure according to claim 10, wherein a second limiting portion is further arranged between each of the through slot structures and the first limiting portion, and sliding of the safety belt in the through slot structures is limited by the second limiting portion, wherein a protruding height of the first limiting portion and/or the second limiting portion in the adjusting portions is higher than a thickness of the safety belt.

12. The safety belt adjusting structure according to claim 8, wherein an opened portion communicated with the vertical slot structure is arranged on a side of the supporting member, and the opened portion is communicated with the at least two through slot structures arranged adjacently through the vertical slot structure.

13. A safety belt adjusting structure adapted for adjusting a position of a safety belt of a child carrier corresponding to shoulders of a child, wherein the safety belt adjusting structure comprises
   a supporting member movably arranged on the child carrier, and
   a plurality of rows of adjusting portions having different heights are arranged on the supporting member for accommodating the safety belt, an opened portion communicated with at least two rows of the adjusting portions is further arranged on a side of the supporting member, and the safety belt is able to be cooperated with the adjusting portions having different heights via the opened portion to adjust the position of the safety belt corresponding to the shoulders of the child,
wherein a guiding portion is arranged between the opened portion and each of the adjusting portions, and the guiding portion has a structure shaping from wide to narrow gradually along a direction in which the opened portion enters each of the adjusting portions.

14. The safety belt adjusting structure according to claim 13, wherein a vertical slot structure is arranged between the opened portion and each of the adjusting portions for the safety belt in vertical state to slide.

15. The safety belt adjusting structure according to claim 14, wherein a connection between each of the adjusting portions and the vertical slot structure/the opened portion is arc-shaped, wherein a guiding portion is arranged between the opened portion and each of the adjusting portions, and the guiding portion has a structure shaping from wide to narrow gradually along a direction in which the opened portion enters each of the adjusting portions, wherein a connection between the guiding portion and the opened portion is arc-shaped.

16. The safety belt adjusting structure according to claim 13, wherein a first limiting portion is further arranged between each of the adjusting portions and the opened portion, and sliding of the safety belt in each of the adjusting portions is limited by the first limiting portion, wherein a second limiting portion is further arranged between each of the adjusting portions and the first limiting portion, and sliding of the safety belt in each of the adjusting portions is limited by the second limiting portion.

17. A child carrier comprising a carrier body, wherein the carrier body is provided with a safety belt adjusting structure and a position of a safety belt corresponding to shoulders of a child is adjusted by the safety belt adjusting structure, wherein the safety belt adjusting structure is adapted for adjusting the position of the safety belt of the child carrier corresponding to the shoulders of the child, wherein the safety belt adjusting structure comprises:

a supporting member movably arranged on the child carrier, wherein the child carrier is further provided with a lifting adjustment structure cooperating with the supporting member, and the supporting member is provided with a clamp member cooperating with the lifting adjustment structure, such that the supporting member is able to be located at different positions of the child carrier by the clamp member being clamped to different positions of the lifting adjustment structure, and a plurality of rows of adjusting portions having different heights are arranged on the supporting member for accommodating the safety belt, such that the position of the safety belt corresponding to the shoulders of the child is adjusted by movement of the supporting member and cooperation of the safety belt with the adjusting portions having different heights.

18. The child carrier according to claim 17, wherein the carrier body is a baby stroller, a sleeping box, or an automobile safety seat.

* * * * *